US011338373B2

(12) United States Patent
Hayakawa et al.

(10) Patent No.: US 11,338,373 B2
(45) Date of Patent: May 24, 2022

(54) INSERT AND BODY

(71) Applicant: OSG CORPORATION, Toyokawa (JP)

(72) Inventors: Koji Hayakawa, Toyokawa (JP); Daiki Nakamura, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 966 days.

(21) Appl. No.: 16/074,830

(22) PCT Filed: Jan. 8, 2018

(86) PCT No.: PCT/JP2018/000136
§ 371 (c)(1),
(2) Date: Aug. 2, 2018

(87) PCT Pub. No.: WO2019/135290
PCT Pub. Date: Jul. 11, 2019

(65) Prior Publication Data
US 2021/0205902 A1    Jul. 8, 2021

(51) Int. Cl.
*B23C 3/12*         (2006.01)
*B23C 5/10*         (2006.01)
(Continued)

(52) U.S. Cl.
CPC .................. *B23C 3/12* (2013.01); *B23C 5/10* (2013.01); *B23C 5/22* (2013.01); *B23C 5/24* (2013.01)

(58) Field of Classification Search
CPC .... B23C 3/12; B23C 5/10; B23C 5/22; B23C 5/24; B23C 5/2204; B23C 5/2221;
(Continued)

(56) References Cited

U.S. PATENT DOCUMENTS 4,812,087 A * 3/1989 Stashko ................. B23C 5/109
407/113
4,848,977 A * 7/1989 Kieninger ............. B23C 5/2462
407/39
(Continued)

FOREIGN PATENT DOCUMENTS

CA    2421081 A1 * 3/2002 .......... B23C 5/2221
CN    1187785 A      7/1998
(Continued)

OTHER PUBLICATIONS

Office Action dated Mar. 12, 2020, issued in counterpart CN application No. 201880000796.7, with English translation. (14 pages).
(Continued)

*Primary Examiner* — Nicole N Ramos
(74) *Attorney, Agent, or Firm* — WHDA, LLP

(57) ABSTRACT

An insert is provided, ensuring to vary the cutout angle of the cutting edge without replacing the body, and to prevent the change in the cutout angle of the cutting edge in the cutting process. The insert includes a constraining part, a through hole, and a blade. The blade includes a cutting edge for the cutting process. An outer surface of the constraining part around the central axis includes a pair of first constraining surfaces, and a pair of second constraining surfaces. The cutting edge in the state where the pair of first constraining surfaces are fixed becomes non-parallel to the cutting edge in the state where the constraining part is rotated around the central axis from the fixed state of the pair of first constraining surfaces to place the pair of second constraining surfaces on the same surface on which the pair of first constraining surfaces have been fixed.

6 Claims, 10 Drawing Sheets

(51) Int. Cl.
  *B23C 5/24*  (2006.01)
  *B23C 5/22*  (2006.01)

(58) Field of Classification Search
  CPC ... B23C 5/202; B23C 5/2213; B23C 2200/45; B23C 2210/16; B23C 2210/161; B23C 2210/163; B23C 2210/168; B23C 2210/165; B23C 2210/207; B23C 2240/24
  See application file for complete search history.

(56) References Cited

U.S. PATENT DOCUMENTS

| | | | |
|---|---|---|---|
| 5,913,643 A * | 6/1999 | Fowler | B23B 51/10 407/36 |
| 5,947,650 A | 9/1999 | Satran et al. | |
| 6,053,671 A | 4/2000 | Stedt et al. | |
| 6,152,658 A * | 11/2000 | Satran | B23B 27/00 407/103 |
| 6,164,878 A | 12/2000 | Satran et al. | |
| 8,430,607 B2 * | 4/2013 | Jansson | B23C 5/06 407/113 |
| 9,216,458 B2 * | 12/2015 | Sashin | B23C 5/2406 |
| 2002/0168235 A1 | 11/2002 | Johnson | |
| 2004/0131432 A1 | 7/2004 | Riviere | |
| 2017/0120351 A1 * | 5/2017 | Fang | B23C 5/205 |
| 2017/0320145 A1 * | 11/2017 | Pettersson | B23C 5/06 |
| 2018/0001399 A1 | 1/2018 | Kister | |

FOREIGN PATENT DOCUMENTS

| | | | |
|---|---|---|---|
| CN | 1196695 A | 10/1998 | |
| CN | 1703293 A | 11/2005 | |
| CN | 201061833 Y | 5/2008 | |
| DE | 198 46 548 A1 | 5/2000 | |
| DE | 103 08 037 A1 | 9/2004 | |
| JP | 2000-334613 A | 12/2000 | |
| JP | 3176284 U * | 6/2012 | |
| JP | 2017071056 A * | 4/2017 | B23C 5/207 |
| WO | 2004/062840 A1 | 7/2004 | |

OTHER PUBLICATIONS

International Search Report and Written Opinion in Japanese dated Feb. 20, 2018, issued in counterpart International Application No. PCT/JP2018/000136 (7 pages).

Extended Search Report dated Jul. 11, 2019, issued in counterpart EP Application No. 18758530.2 (17 pages).

Written Opinion of the International Search Authority dated Dec. 20, 2018, issued in counterpart International Application No. PCT/JP2018/000136. (7 pages).

* cited by examiner

INSERT AND BODY

TECHNICAL FIELD

The present invention relates to an insert and a body of an indexable tool. More specifically, the present invention relates to an insert and a body, ensuring to vary a cutout angle of a cutting edge without replacing the body, and further to prevent change in the cutout angle of the cutting edge in the cutting process.

BACKGROUND ART

An indexable tool that has a plate-like insert with a cutting edge assembled with a tip end of the shaft-like body has been well known as the tool used for cutting (for example, chamfering) the workpiece. The indexable tool is configured to rotate the body around the axial center so as to allow the cutting edge of the insert that is inclined relative to the axial center of the body to cut the workpiece. It has been known that the indexable tool is configured to change the inclination angle of the cutting edge relative to the axial center of the body without replacing the body or the insert so as to vary the cutout angle of the cutting edge in accordance with the inclination angle (Patent Literature 1).

In the disclosure of Patent Literature 1, the fan-like insert is fitted with the fan-like recess formed in the body, and is further pressed by the fixture against the body in the plate thickness direction so that the insert is fixed to the body. Loosening of fixation with the fixture allows the fan-like insert to be rotatably moved in the fan-like recess so as to adjust the cutout angle of the cutting edge.

CITATION LIST

Patent Literature

PTL 1: Japanese Unexamined Patent Application Publication No. 2000-334613

SUMMARY OF INVENTION

Technical Problem

In the case of the above-described conventional art, upon application of the force to the insert perpendicularly to the plate thickness direction in the cutting process, the insert may be rotatably moved. This may cause the problem of changing the inclination angle of the cutting edge relative to the axial center of the body.

The present invention has been made to solve the above-described problem. It is therefore an object of the present invention to provide the insert and the body, ensuring to vary the cutout angle of the cutting edge without replacing the body, and further to prevent change in the cutout angle of the cutting edge in the cutting process.

Solution to Problem

In order to achieve the object, the present invention provides an insert for a cutting process, which is constrained with a pair of side wall surfaces of a fitting recess formed in a body of an indexable tool, and assembled with the body by fastening with a shaft-like fastening member. The insert includes a constraining part fitted with the fitting recess, a through hole piercing through the constraining part, through which the fastening member is inserted, and a blade projecting from the constraining part to a direction at right angles with a central axis of the through hole. The blade includes a cutting edge for the cutting process, which forms a part of an edge apart from the central axis. An outer surface of the constraining part around the central axis includes a pair of first constraining surfaces abuttable on the pair of side wall surfaces, and a pair of second constraining surfaces having an angle formed therebetween being the same as an angle formed between the pair of first constraining surfaces in an axially right angle section of the constraining part perpendicular to the central axis, and having at least one surface different from the pair of first constraining surfaces. The shortest distance from the central axis to the pair of first constraining surfaces is set to be the same as the shortest distance from the central axis to the pair of second constraining surfaces in the axially right angle section. The cutting edge in a state where the pair of first constraining surfaces are fixed becomes non-parallel to the cutting edge in a state where the constraining part is rotated around the central axis from a fixed state of the pair of first constraining surfaces to place the pair of second constraining surfaces on the same surface on which the pair of first constraining surfaces have been fixed.

Advantageous Effects of Invention

The insert as described in a first aspect provides the following effect. The constraining part is fitted with the fitting recess so that the pair of first constraining surfaces are abutted on the pair of side wall surfaces, respectively. Then the fastening member is inserted into the through hole of the constraining part to assemble the insert with the body using the fastening member. As a result, the first constraining surfaces are constrained with the side wall surfaces, thus locking the rotation of the insert around the through hole (fastening member).

Referring to the axially right angle section of the constraining part, perpendicular to the central axis, the shortest distance from the central axis to the first constraining surface is set to be the same as the shortest distance from the central axis to the second constraining surface. Furthermore, the angle formed between the pair of first constraining surfaces is set to be the same as the angle formed between the pair of second constraining surfaces. The constraining part is rotated around the through hole (fastening member) from the abutment state of the pair of first constraining surfaces on the pair of side wall surfaces, respectively to allow abutment of the pair of second constraining surfaces on the pair of side wall surfaces without changing the position of the fastening member or replacing the body. In the above-described case, the fastening member for assembling the insert with the body constrains the second constraining surfaces with the side wall surfaces. This makes it possible to lock the rotation of the insert around the through hole. Accordingly, abutment of the first constraining surfaces or the second constraining surfaces on the side wall surfaces makes sure to prevent the cutout angle of the cutting edge from being changed resulting from rotation of the insert in the cutting process.

The cutting edge when the pair of first constraining surfaces are fixed becomes non-parallel to the cutting edge when the constraining part is rotated around the central axis from the fixed state of the pair of first constraining surfaces to place the pair of second constraining surfaces on the same surface on which the pair of first constraining surfaces have been fixed. In other words, the cutout angle of the cutting edge upon abutment of the first constraining surfaces on the side wall surfaces may be made different from the cutout angle of the cutting edge upon abutment of the second constraining surfaces on the side wall surfaces. As a result, it is possible to vary the cutout angle of the cutting edge without replacing the body, and further to prevent change in the cutout angle of the cutting edge in the cutting process.

In addition to the effect derived from the insert as described in the first aspect, the insert according to a second aspect provides the following effect. In an axially right angle section of the constraining part perpendicular to the central axis, the first constraining surface has the same length as that of the second constraining surface. Therefore, it is possible to reduce the difference between the contact area of the first constraining surface in abutment on the side wall surface, and the contact area of the second constraining surface in abutment on the side wall surface. This makes it possible to reduce the difference in the load applied between the insert and the body between the state where the first constraining surfaces are abutted on the side wall surfaces, and the state where the second constraining surfaces are abutted on the side wall surfaces, allowing the use of the insert with the same specification in the cutting process.

In addition to the effect derived from the insert as described in the first aspect, the insert according to a third aspect provides the following effect. Each of the first constraining surfaces and the second constraining surfaces is inclined relative to the central axis of the through hole to become closer to the central axis as each of the first constraining surfaces and the second constraining surfaces become distant from the blade. Slight separation of the insert from the body by loosening the fastening force applied by the fastening member while holding the state where the fastening member is inserted into the through hole allows separation of the first or the second constraining surfaces in abutment on the side wall surfaces therefrom. It is possible to suppress interference with the rotation of the insert around the through hole (fastening member) by the contact between the first or the second constraining surfaces and the side wall surfaces without largely separating the insert from the body. Slight separation of the insert from the body while holding the state where the fastening member is inserted into the through hole easily switches the surface in abutment on the side wall surfaces between the first constraining surfaces and the second constraining surfaces. As a result, it is possible to facilitate the process for varying the cutout angle of the cutting edge.

In addition to the effect derived from the insert as described in the first aspect, the insert according to a fourth aspect provides the following effect. The cutting edge is one side of the blade with a polygonal shape in the view of the axial direction of the central axis. The outer surface of the constraining part is formed into a polygonal shape having the number of apexes different from the number of apexes of the blade in the view of the axial direction of the central axis. Each side of the outer surfaces of the constraining part constitutes the first constraining surface or the second constraining surface. As described above, the blade, the first constraining surfaces, and the second constraining surfaces are formed on the whole circumference. The number of apexes of the polygonal shape is different between the blade and the constraining part. Consequently, it is possible to vary the cutout angle of the cutting edge, and further to switch the single side of the blade as the cutting edge for the cutting process without replacing the body by changing the surfaces in abutment on the side wall surfaces of the body between the first constraining surfaces and the second constraining surfaces.

In addition to the effect derived from the insert as described in the fourth aspect, the insert according to a fifth aspect provides the following effect. The number of apexes of the constraining part is set to the value as the integer multiple of the number of apexes of the blade. It is therefore possible to provide patterns of the cutout angle of the single side of the blade by a multiple of the corresponding integer. This makes it possible to suppress biased use of the specific side of the blade with many cutout angle patterns, resulting in prolonged tool life of the insert.

The body as described in a sixth aspect is the shaft-like body for the indexable tool, with which the insert as described in the fourth aspect is assembled through fastening using the fastening member. In addition to the effect derived from the insert as described in the fourth aspect, the following effect is provided. The constraining part of the insert is fitted with the fixing recess formed by making a recess circumferentially so that the pair of first constraining surfaces or the pair of second constraining surfaces are abutted on the pair of side wall surfaces of the fitting recess. One of the positioning parts is formed on the body at the position corresponding to the apex of the constraining part when the pair of first constraining surfaces are abutted on the pair of side wall surfaces, respectively, and the other is formed at the position corresponding to the apex of the constraining part when the pair of second constraining surfaces are abutted on the pair of side wall surfaces. It is possible to confirm as to which constraining surfaces are abutted on the side wall surfaces, the first constraining surfaces or the second constraining surfaces in reference to the correlation between the positioning part and the apex of the constraining part when the insert is assembled with the body. This ensures to facilitate identification of the cutout angle of the cutting edge in reference to the correlation between the positioning part and the apex of the constraining part.

DESCRIPTION OF EMBODIMENTS

Figure 1:
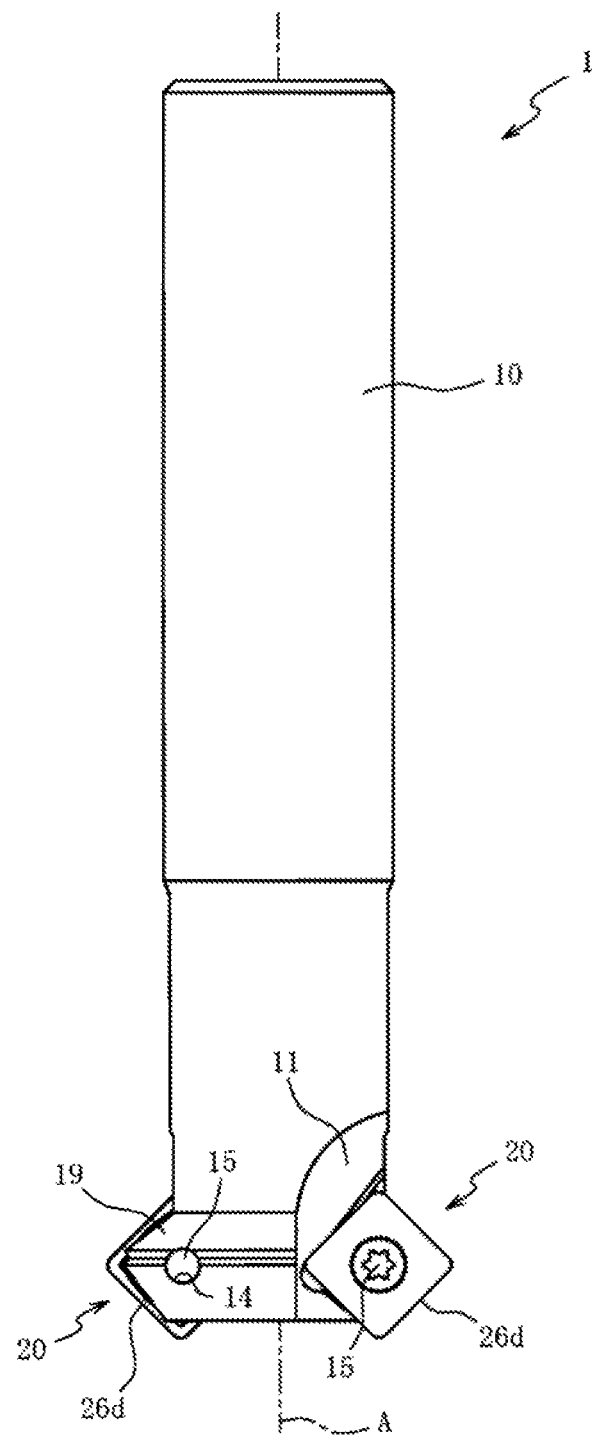
FIG. 1 is a front view of an indexable chamfering tool according to a first embodiment of the present invention.

Preferred embodiments of the present invention will be described referring to the drawings. An overall structure of an indexable chamfering tool 1 (hereinafter referred to as "tool 1") will be described referring to FIG. 1. FIG. 1 is a front view of the tool 1 according to a first embodiment of the present invention. The following description will be made on the assumption that the upper side of FIG. 1 corresponds to the upper side of the tool 1, and the lower side of FIG. 1 corresponds to the lower side of the tool 1. However, the actual upper side or the lower side of the tool 1 does not necessarily correspond to those shown in the drawing.

As FIG. 1 shows, the tool 1 is used for the chamfering process (cutting process) of a corner of a workpiece (not shown). The tool 1 includes a shaft-like body 10, and an insert 20 detachably assembled with the body 10 using a fastening member 15. The insert 20 with a cutting edge 26d may be detachably assembled with the tool 1. It is therefore possible to replace the insert 20 in the case of breakage or wear of the cutting edge 26d.

The upper end of the body 10 is held with a drive unit (not shown) such as the NC milling machine and the machining center so that the tool 1 is rotated around an axial center A of the body 10. Then the workpiece is chamfered by the cutting edge 26d of the insert 20 assembled with the lower end (tip end) of the body 10.

Figure 2A:
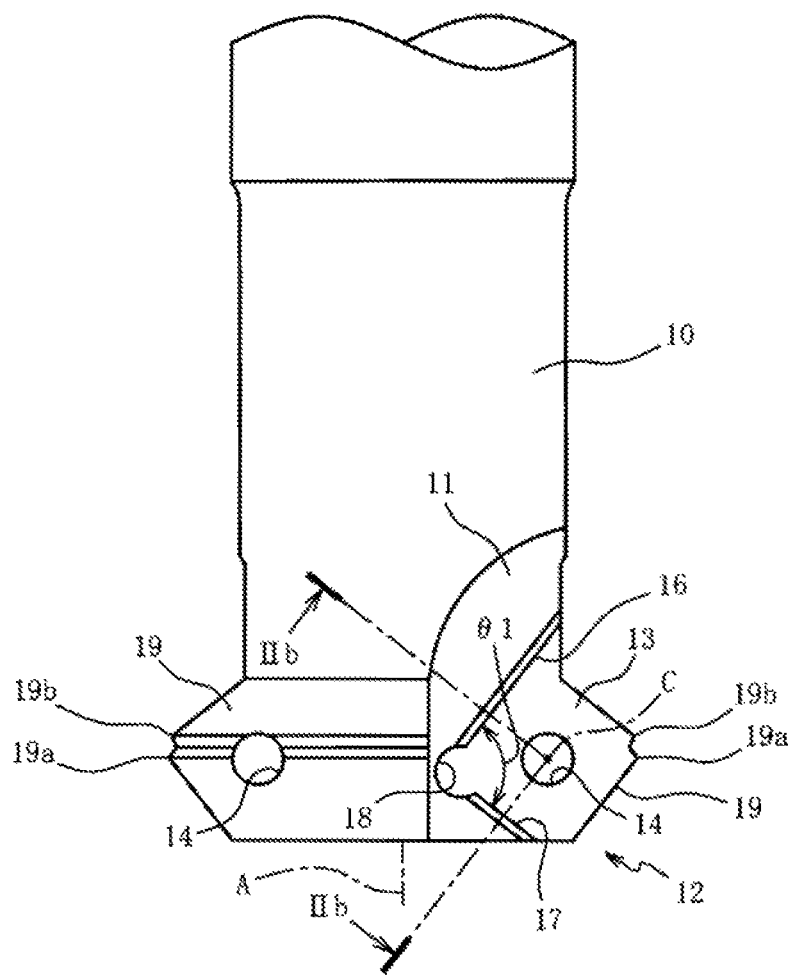
FIG. 2(a) is a front view of a body.
Figure 2B:
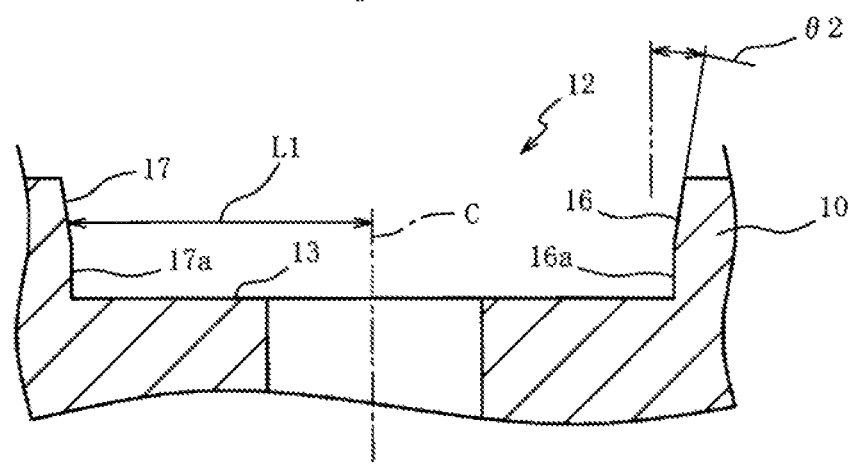
FIG. 2(b) is a sectional view of the body taken along line IIb-IIb of FIG. 2(a).
Figure 4A:
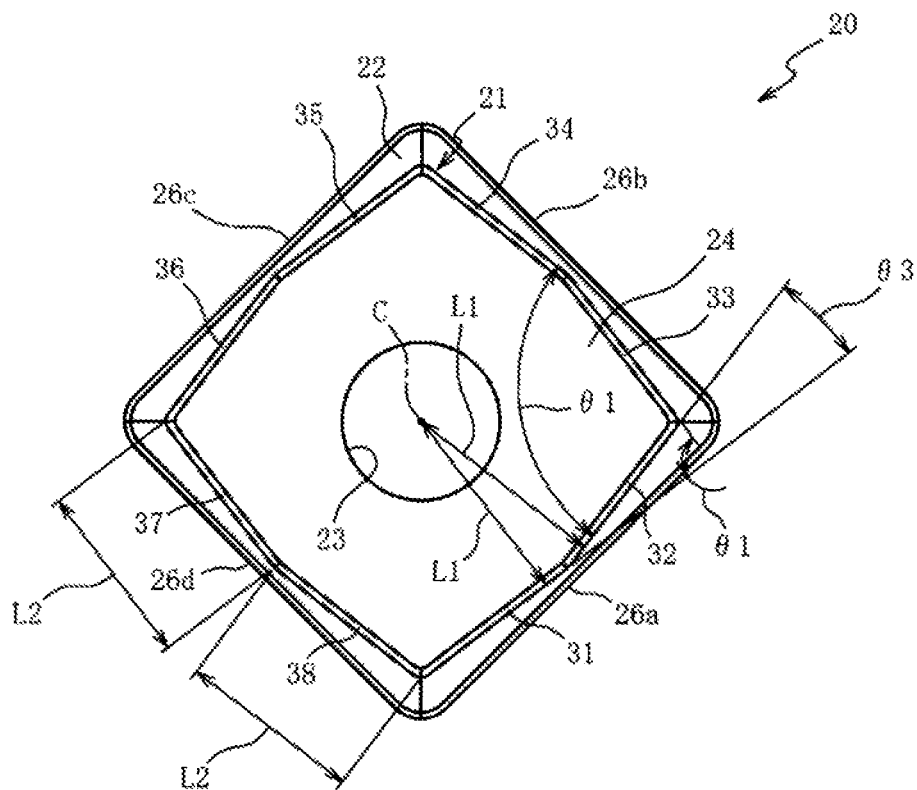
FIG. 4(a) is a back view of the insert.
Figure 4B:
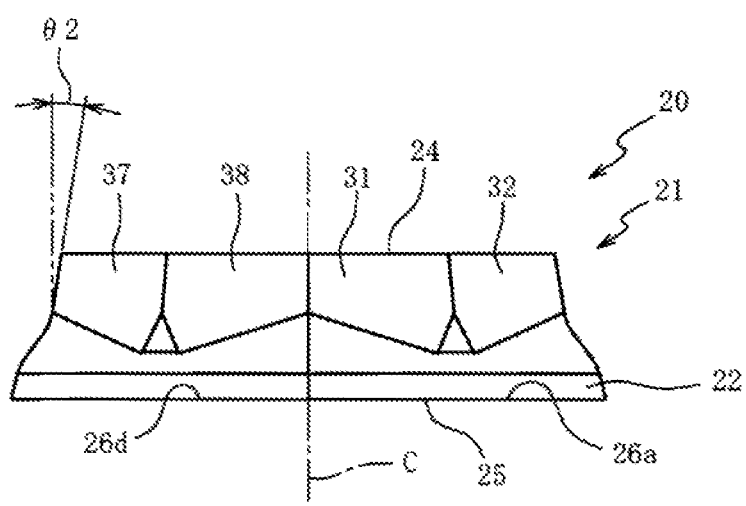
FIG. 4(b) is a side view of the insert.

The body 10 will be described in detail referring to FIGS. 2(a) and 2(b). FIG. 2(a) is a front view of the body 10. FIG. 2(b) is a sectional view of the body 10 taken along line IIb-IIb of FIG. 2(a). FIG. 2(a) omits illustration of the upper side of the body 10. For convenience of explanation, FIGS. 2(b) and 4(b) show the inclination angle relative to a central axis C as the one relative to a virtual line parallel to the central axis C.

As FIG. 2(a) shows, the body 10 is a substantially columnar member made of such material as a high speed tool steel and a superalloy. The body 10 includes two grooves 11 each formed by making a recess radially inwardly in the tip end (lower end) of the body 10. The insert 20 (see FIG. 1) is disposed in each of the two grooves 11. The body 10 having the grooves 11 is formed in a rotationally symmetrical manner relative to the axial center A.

The groove 11 includes a fitting recess 12 formed by making a recess in the circumferential direction of the body 10. A bottom surface 13 of the fitting recess 12 has a fastener hole 14 which pierces through the body 10 perpendicularly to the bottom surface 13. The fastening member 15 (see FIG. 1) as a screw is fastened into the fastener hole 14. The fastening member 15 fastened into the fastener hole 14 is disposed perpendicularly to the bottom surface 13. The central axis C of the fastener hole 14 substantially coincides with the central axis of the fastening member 15 fastened into the fastener hole 14.

The fitting recess 12 is a substantially rectangular-shaped recess formed so that each side is non-parallel to the axial center A in the view of the axial direction of the central axis C. Two sides of the fitting recess 12 closer to the axial center A constitute side wall surfaces 16, 17, and two sides apart from the axial center A are opened radially outwardly. The insert 20 (see FIG. 1) is partially fitted with the fitting recess 12 while being partially abutted on the bottom surface 13 and the pair of side wall surfaces 16 and 17.

The body 10 includes a projection part 19 which projects radially outwardly from the outer circumferential surface between the grooves 11 at the tip end, forming an angular shape. The projection part 19 secures the area of the insert 20 supported by the bottom surface 13. The tip end of the angle-shaped projection part 19 includes two positioning parts 19a, 19b as two apexes.

In the view of the axial direction of the central axis C, an angle θ1 formed between the side wall surfaces 16 and 17 is 90°. A relief part 18 is formed in the groove 11 of the body 10 by making a recess so that the corner between the side wall surfaces 16 and 17 becomes distant from the fastener hole 14. The relief part 18 is formed to prevent the corner of the insert 20 fitted with the fitting recess 12 from being in contact with the body 10.

As FIG. 2(b) shows, each of the side wall surfaces 16, 17 is primarily inclined at an angle θ2 relative to the central axis C so as to become distant from each other as the side wall surfaces 16, 17 get apart from the bottom surface 13. In the embodiment, the side wall surfaces 16, 17 include perpendicular surfaces 16a, 17a, respectively, rising substantially perpendicularly from the bottom surface 13. It is possible to make the side wall surfaces 16, 17 entirely inclined relative to the central axis C by omitting the perpendicular surfaces 16a, 17a.

The perpendicular surfaces 16a, 17a are not in contact with the insert 20. The above-described structure allows the perpendicular surfaces 16a, 17a to absorb any manufacturing error in the fitting recess 12 of the body 10 and the insert 20 so as to sufficiently bring the insert 20 into tight contact with the fitting recess 12.

Figure 3:
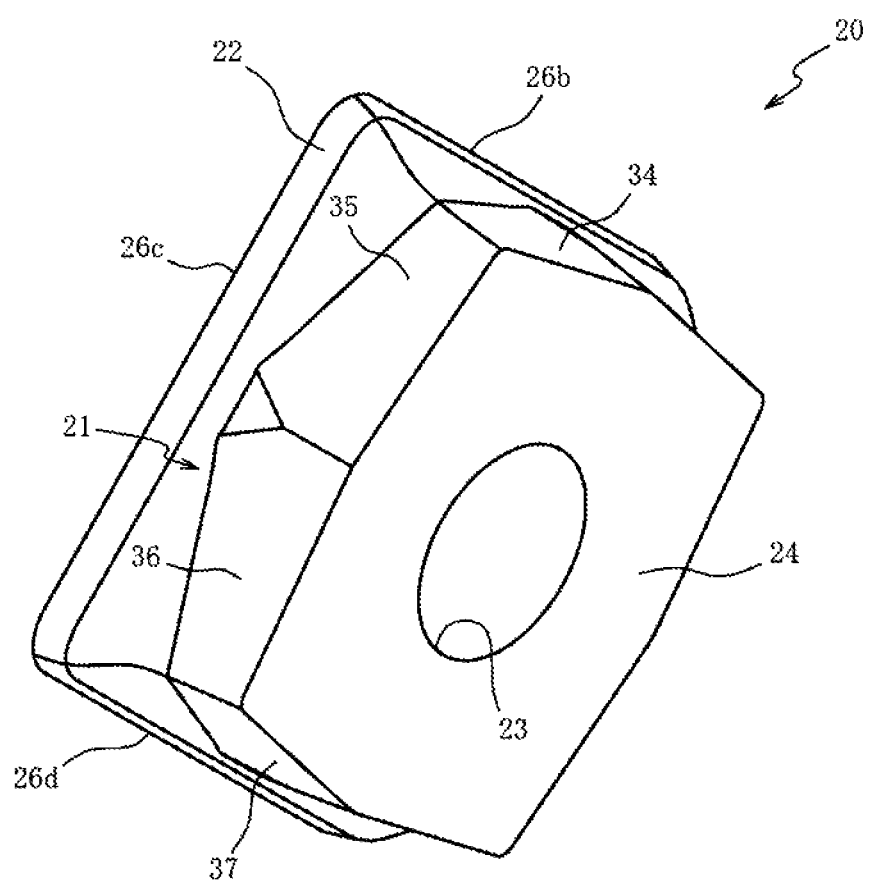
FIG. 3 is a perspective view of a back side of an insert.

The insert 20 will be described in detail referring to FIGS. 3 and 4. FIG. 3 is a perspective view of the back surface of the insert 20. FIG. 4(a) is a back view of the insert 20. FIG. 4(b) is a side view of the insert 20.

The insert 20 is made of such material as the high speed tool steel and the superalloy. As FIGS. 3 to 4(b) show, the insert 20 includes a plate-like constraining part 21 and a blade 22 integrated with the constraining part 21.

The constraining part 21 is fitted with the fitting recess 12 (see FIGS. 2(a) and 2(b)), and formed into a truncated octagonal pyramid shape while having the height in the plate thickness direction. The constraining part 21 includes a through hole 23, piercing through its center along the plate thickness direction, and outer surfaces 31, 32, 33, 34, 35, 36, 37, 38 sequentially formed around the through hole 23.

The fastening member 15 (see FIG. 1) is inserted into the through hole 23, and fastened into the fastener hole 14 (see FIG. 2(a)) so that the insert 20 is assembled with the body 10 (see FIG. 1). As the central axis of the through hole 23 substantially coincides with the central axis C of the fastener hole 14 and the fastening member 15 upon assembly of the insert 20 with the body 10, it will be designated with the same code. Actually, upon fastening of the fastening member 15, the constraining part 21 is brought into tight contact with the side wall surfaces 16, 17 of the fitting recess 12 under pressure. In the above-described circumstance, the central axis of the fastener hole 14 may be slightly deviated from the central axis of the through hole 23.

The outer surfaces 31 to 38 of the constraining part 21 with the truncated octagonal pyramid shape are inclined relative to the central axis C so that the outer surfaces get closer to the central axis C as the outer surfaces become distant from the blade 22 in the axial direction of the central axis C. Each inclination angle θ2 of the respective outer surfaces 31 to 38 of the constraining part 21 relative to the central axis C is set to the same value as each inclination angle θ2 of the side wall surfaces 16, 17 relative to the central axis C.

The back surface 24 of the constraining part 21, as one of surfaces perpendicular to the central axis C, has its outer shape made relatively small because of inclination relative to the central axis C. The front surface 25, as another surface perpendicular to the central axis C, has its outer shape made relatively large (at the side of the blade 22) because of inclination relative to the central axis C. In the back view (in the view of the axial direction of the central axis C), the back surface 24 has substantially the same shape as that of the section of the constraining part 21 perpendicular to the central axis C (hereinafter referred to as "axially right angle section of the constraining part 21"). The outer dimension of the axially right angle section of the constraining part 21 gradually becomes larger from the back surface 24 toward the front surface 25.

The angle and dimension of the axially right angle section of the constraining part 21 will be explained in reference to the back view of the constraining part 21 as shown in FIG. 4(a) in place of the axially right angle section of the constraining part 21. This also applies to the second, the third, and the fourth embodiments to be described below.

The outer surfaces 31, 33, 35, 37 are flat surfaces corresponding to the outer surfaces of the specific truncated square pyramid, respectively. Referring to the axially right angle section of the constraining part 21, the respective angles formed between the outer surfaces 31 and 33, 31 and 37, 35 and 33, 35 and 37 are set to 90° that is the same angle as the above-described angle θ1. In this embodiment, each of the outer surfaces 31, 33, 35, 37 is referred to as a first constraining surface.

The outer surfaces 32, 34, 36, 38 are flat surfaces corresponding to the outer surfaces of the truncated square pyramid, respectively in the state where the truncated square pyramid with the outer surfaces corresponding to the outer surfaces 31, 33, 35, 37 is rotated around the central axis C at an angle θ3. In other words, the respective angles formed between the outer surfaces 32 and 34, 32 and 38, 36 and 34, 36 and 38 are set to 90° that is the same angle as the above-described angle θ1. In this embodiment, each of the outer surfaces 32, 34, 36, 38 is referred to as a second constraining surface. It is possible to set the outer surfaces 32, 34, 36, 38 to the first constraining surfaces, and the outer surfaces 31, 33, 35, 37 to the second constraining surfaces.

Referring to the axially right angle section of the constraining part 21, each of the outer surfaces 31, 33, 35, 37 (first constraining surfaces), and the outer surfaces 32, 34, 36, 38 (second constraining surfaces) becomes one side of the octagonal shape. In this embodiment (specification), one of the outer surfaces 31, 33, 35, 37, or one of the outer surfaces 32, 34, 36, 38 will be described as the single side of the outer surfaces 31, 33, 35, 37, or the single side of the outer surfaces 32, 34, 36, 38.

Referring to the axially right angle section of the constraining part 21, each of the shortest distances L1 (length of the perpendicular line from the central axis C to each of the respective outer surfaces 31 to 38) from the central axis C to each of the outer surfaces 31 to 38 is set to the same value. Referring to the axially right angle section perpendicular to the central axis C at the same height from the back surface 24 of the constraining part 21 and the bottom surface 13 of the fitting recess 12, each of the shortest distances L1 from the central axis C to each of the outer surfaces 31 to 38 is set to the same value as the shortest distance L1 (see FIG. 2(b)) from the central axis C to each of the inclined side wall surfaces 16, 17, respectively. Referring to the axially right angle section of the constraining part 21 with substantially octagonal shape, if each of the shortest distances L1 from the central axis C to each of the respective outer surfaces 31 to 38 is set to the same value, each length of the outer surfaces 31 to 38 is set to the same length L2.

The blade 22 radially projects from the outer surfaces 31 to 38 of the constraining part 21 at the side of the front surface 25 in the radial direction orthogonal to the central axis C. The blade 22 is formed to have a substantially square shape having the central axis C as the center in the view of the axial direction of the central axis C. In the view of the axial direction of the central axis C, the constraining part 21 is disposed at inner side of edges 26a, 26b, 26c, 26d each as the side of the substantially square shaped blade 22.

One of the edges 26a, 26b, 26c, 26d becomes the cutting edge used for chamfering the workpiece (not shown) by cutting in the chamfering process. Specifically, upon assembly of the insert 20 with the body 10, any one of the edges 26a, 26b, 26c, 26d, which is directed to face the tip end of the body 10 while being apart from the axial center A of the body 10 becomes the cutting edge for the chamfering process.

Each single side of the outer surfaces 31 and 32 of the insert 20 is disposed to face the edge 26a. Similarly, the outer surfaces 33 and 34 are disposed to face the edge 26b. Similarly, the outer surfaces 35 and 36 are disposed to face the edge 26c. Similarly, the outer surfaces 37 and 38 are disposed to face the edge 26d.

An apex formed between the outer surfaces 33 and 32 is positioned on the line formed by connecting the apex formed between the edges 26a and 26b with the central axis C. The insert 20 is formed around the central axis C in a four-fold symmetrical manner.

Referring to the axially right angle section of the constraining part 21 (back surface 24), the angle formed between an extended line of the outer surface 31 and the outer surface 32, which are directed to face the cutting edge (edge 26a) as the single side becomes θ3 as described above. Similarly, each angle formed between the extended line of the outer surface 33 and the outer surface 34, the extended line of the outer surface 35 and the outer surface 36, and the extended line of the outer surface 37 and the outer surface 38 becomes θ3.

Each angle formed between the outer surfaces 31 and 38, 33 and 32, 35 and 34, 37 and 36 becomes the value obtained by adding 90° to the angle θ3.

Figure 5A:
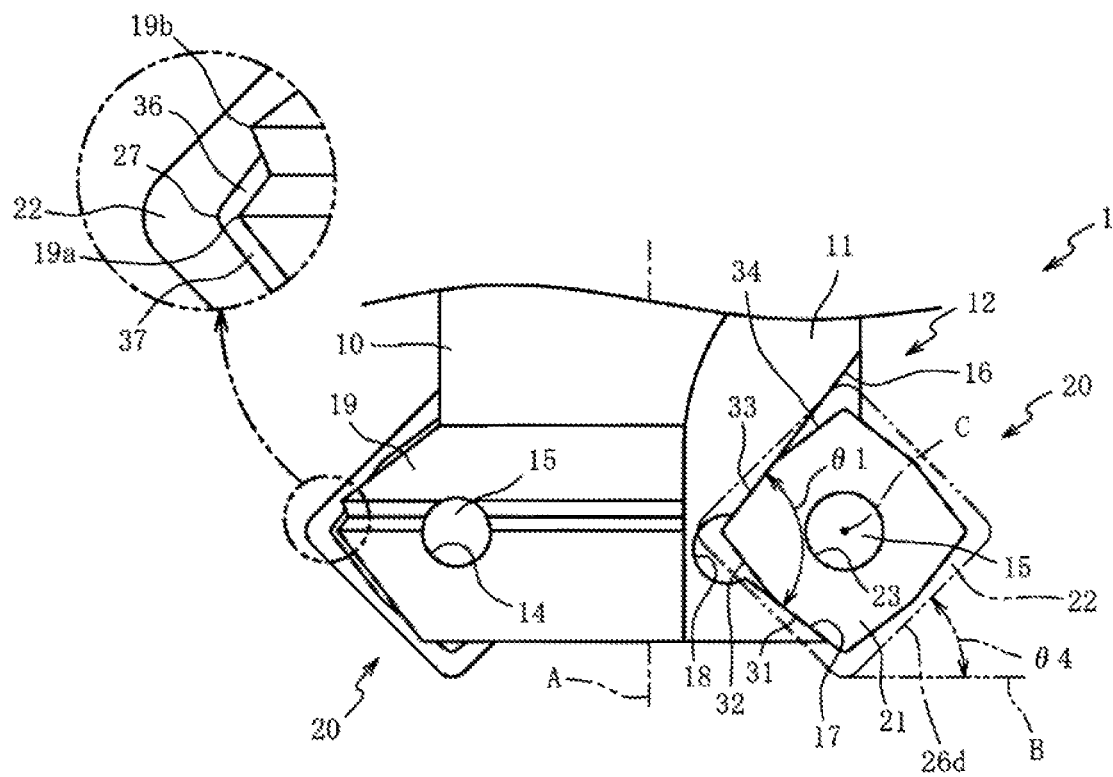
FIG. 5(a) is a schematic view of the indexable chamfering tool having first constraining surfaces abutted on side wall surfaces.
Figure 5B:
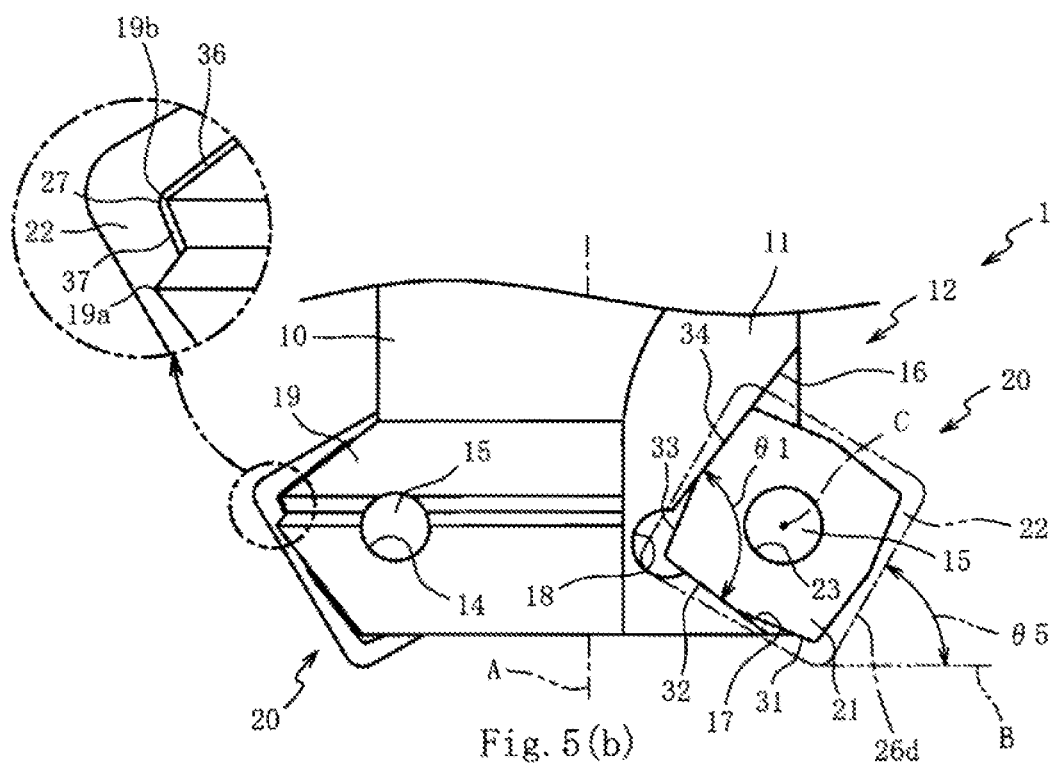
FIG. 5(b) is a schematic view of the indexable chamfering tool having second constraining surfaces abutted on the side wall surfaces.

The usage of the tool 1 will be described referring to FIGS. 5(a) and 5(b). FIG. 5(a) is a schematic view of the tool 1 in the state where the outer surfaces 31, 33 are abutted on the side wall surfaces 16, 17, respectively. FIG. 5(b) is a schematic view of the tool 1 in the state where the outer surfaces 32, 34 are abutted on the side wall surfaces 16, 17, respectively. FIGS. 5(a) and 5(b) omit illustration of each inclination of the outer surfaces 31, 33, and the side wall surfaces 16, 17 relative to the central axis C. FIGS. 5(a) and 5(b) are explanatory views primarily showing the insert 20 at the right side of the drawing. However, the insert 20 at the left side of the drawing is assembled with the body 10 in the same manner as the insert 20 at the right side of the drawing.

As FIG. 5(a) shows, the constraining part 21 is fitted with the fitting recess 12. Then the fastening member 15 is fastened into the fastener hole 14 of the body 10 while being inserted into the through hole 23 of the constraining part 21 so that the insert 20 is assembled with the body 10. In the above-described state, the pair of outer surfaces 31 and 33 are abutted on the pair of side wall surfaces 16 and 17, respectively to satisfy the three conditions as described below.

A first condition is satisfied if the angle θ1 formed between the pair of side wall surfaces 16 and 17 is the same as the angle θ1 formed between the pair of outer surfaces 31 and 33. A second condition is satisfied if each inclination angle θ2 of the side wall surfaces 16, 17 relative to the central axis C is the same as each inclination angle θ2 of the outer surfaces 31, 33 relative to the central axis C (see FIGS. 2(b) and 4(b)). A third condition is satisfied if the shortest distance L1 from the central axis C to the pair of outer surfaces 31 and 33 is the same as the shortest distance L1 from the central axis C to the inclined side wall surfaces 16, 17 in reference to the axially right angle section perpendicular to the central axis C at the same height from the back surface 24 of the constraining part 21 and the bottom surface 13 of the fitting recess 12.

The edge 26d of the insert 20 of the tool 1 in the above-described conditions becomes the cutting edge for the chamfering process. In the view of the axial direction of the central axis C, the workpiece (not shown) is chamfered by the cutting edge 26d at the chamfering angle θ4 formed between the cutting edge 26d and a virtual plane B corresponding to the plane perpendicular to the axial center A of the tool 1. In this embodiment, the chamfering angle θ4 is set to 45° as the most frequently used angle.

The fastening member 15 is inserted into the through hole 23 so that the pair of outer surfaces 31 and 33 are in contact with the pair of side wall surfaces 16 and 17, respectively. Accordingly, the pair of outer surfaces 31 and 33 are constrained with the pair of side wall surfaces 16, 17, respectively so as to lock the rotation of the insert 20 around the through hole 23 (fastening member 15). This makes it possible to prevent change in the chamfering angle θ4 of the cutting edge 26d, caused by the rotation of the insert 20 in the chamfering process.

Referring to the section perpendicular to the central axis C, the angle θ1 formed between the pair of outer surfaces 31 and 33 is the same as the angle θ1 formed between the pair of outer surfaces 32 and 34. The inclination angle θ2 of the outer surfaces 31, 33 relative to the central axis C is the same as the inclination angle θ2 of the outer surfaces 32, 34 relative to the central axis C. Referring to the axially right angle section perpendicular to the central axis C, the shortest distance L1 from the central axis C to the pair of outer surfaces 31 and 33 is the same as the shortest distance L1 from the central axis C to the pair of outer surfaces 32 and 34.

As a result, the counterclockwise rotation of the constraining part 21 at the angle θ3 around the through hole 23 (fastening member 15) from the abutment state of the pair of outer surfaces 31 and 33 on the pair of side wall surfaces 16 and 17, respectively allows abutment of the pair of outer surfaces 32 and 34 on the pair of side wall surfaces 16 and 17, respectively as shown in FIG. 5(b). In the above-described case, it is not necessary to change the position of the fastening member 15 fastened to the body 10, or replace the body 10. In this case, the edge 26d of the insert 20 becomes the cutting edge.

In the case where the pair of outer surfaces 32 and 34 are abutted on the pair of side wall surfaces 16 and 17, respectively, the chamfering angle as an angle θ5 formed between the virtual plane B and the cutting edge 26d is different from the chamfering angle θ4 in the abutment state of the pair of outer surfaces 31 and 33 on the side wall surfaces, respectively. The chamfering angle θ5 (for example, 60°) is obtained by adding the angle θ3 (for example, 15°) to the angle θ4 (45° in this embodiment).

The cutting edge 26d in the fixed state of the pair of outer surfaces 31 and 33 becomes non-parallel to the cutting edge 26d in the state where the constraining part 21 is rotated at the angle θ3 around the central axis C from the fixed state of the pair of outer surfaces 31 and 33 to place the pair of outer surfaces 32 and 34 on the same surfaces (the pair of side wall surfaces 16 and 17) as those to which the pair of outer surfaces 31 and 33 have been fixed, resulting in inclination at the angle θ3.

In the case where the pair of outer surfaces 32 and 34 are abutted on the pair of side wall surfaces 16 and 17, respectively, the pair of outer surfaces 32 and 34 may be constrained with the pair of side wall surfaces 16 and 17 by assembling the insert 20 with the body 10 using the fastening member 15. This ensures to lock the rotation of the insert 20 around the through hole 23. In other words, it is possible to suppress change in the chamfering angle θ5 of the cutting edge 26d caused by the rotation of the insert 20 in the chamfering process. This makes it possible to vary the chamfering angle of the cutting edge 26d without replacing the body 10, and to prevent change in the chamfering angle of the cutting edge 26d in the chamfering process.

In the view of the axial direction of the central axis C, the blade 22 has a substantially quadrangular shape. The respective sides of the constraining part 21 with substantially octagonal shape constitute the outer surfaces 31, 33, 35, 37, or 32, 34, 36, 38. As described above, the blade 22, the outer surfaces 31, 33, 35, 37, and 32, 34, 36, 38 are provided on the whole circumference. The number of apexes of the blade 22 is different from the number of apexes of the constraining part 21. It is therefore possible to make an arbitrary pair selecting from the outer surfaces 31, 33, 35, 37, or from the outer surfaces 32, 34, 36, 38 abutted on the side wall surfaces 16, 17, respectively except the outer surfaces 31, 33, and 32, 34. This makes it possible to vary the chamfering angle of the cutting edge without replacing the body 10, and further to exchange any of the edges 26a, 26b, 26c, 26d (one side) of the blade 22 as the cutting edge for chamfering. In the case of breakage or wear of the specific cutting edge, any other side may be used as the cutting edge for ensuring the service life of the insert 20.

In the view of the axial direction of the central axis C of the embodiment, the blade 22 has a substantially square shape, and outer surfaces 31, 33, 35, 37 constitute the respective single sides of the square formed by connecting extended lines of those outer surfaces 31, 33, 35, 37. In the case where an arbitrary pair of the outer surfaces 31, 33, 35, 37 are abutted on the side wall surfaces 16 and 17, respectively, the chamfering angle of any of the cutting edges becomes θ4. If the chamfering angle is required to be set to θ4, the cutting edge may be selected from the group consisting of all the edges 26a, 26b, 26c, 26d. This makes it possible to suppress biased use of the specific cutting edge (edge 26a, 26b, 26c, 26d).

Similarly, in the case where an arbitrary pair of the outer surfaces 32, 34, 36, 38 are abutted on the side wall surfaces 16 and 17, respectively, the chamfering angle of any of the cutting edges becomes θ5. If the chamfering angle is required to be set to θ5, the cutting edge may be selected from the group consisting of all the edges 26a, 26b, 26c, 26d. This makes it possible to suppress biased use of the specific cutting edge. As a result, the service life of the insert 20 may be ensured.

In the view of the axial direction of the central axis C, the number of apexes of the constraining part 21 with substantially octagonal shape is set to the value twice the number of apexes of the blade 22 with substantially square shape. It is possible to provide two patterns of the chamfering angle of each of the edges 26a, 26b, 26c, 26d (single side) of the blade 22. This makes it possible to suppress biased use of the specific cutting edge as one of the single sides of the blade 22 with many chamfering angle patterns. This ensures to prolong the service life of the insert 20.

Referring to the axially right angle section of the constraining part 21, each length L2 of the outer surfaces 31, 33, 35, 37 is the same as each length L2 of the outer surfaces 32, 34, 36, 38. It is possible to reduce the difference between the contact area of any pair of the outer surfaces 31, 33, 35, 37 with the side wall surfaces 16, 17, and the contact area of the outer surfaces 32, 34, 36, 38 with the side wall surfaces 16, 17. The smaller the contact area becomes, the higher the load locally applied to the body 10 from the insert 20 in the chamfering process becomes. As a result, the load between the body 10 and the insert 20 is increased. The allowable specification for chamfering such as the rotational speed and the traveling speed of the tool 1 differs depending on the magnitude of the load.

It is possible to reduce the difference in the load between the body 10 and the insert 20 by decreasing the difference between the contact area of an arbitrary pair of the outer surfaces 31, 33, 35, 37 with the side wall surfaces 16, 17, and the contact area of an arbitrary pair of the outer surfaces 32, 34, 36, 38 with the side wall surfaces 16, 17. It is therefore possible to execute the chamfering process using the insert 20 in accordance with the same specification in the case of either the abutment of the arbitrary pair of the outer surfaces 31, 33, 35, 37 on the side wall surfaces 16, 17, or the abutment of the arbitrary pair of the outer surfaces 32, 34, 36, 38 on the side wall surfaces 16, 17.

Referring to the axially right angle section, the larger the number of apexes of the constraining part 21 becomes, the shorter each length L2 of the outer surfaces 31, 33, 35, 37 or the outer surfaces 32, 34, 36, 38 becomes. The shorter the length L2 becomes, the smaller the contact area of the arbitrary pair of the outer surfaces 31, 33, 35, 37, or 32, 34, 36, 38 with the side wall surfaces 16, 17 becomes.

In the embodiment, the constraining part 21 with substantially octagonal shape allows each length L2 of the outer surfaces 31, 33, 35, 37, or 32, 34, 36, 38 to be made relatively large. This allows the respective contact areas between the arbitrary pair of the outer surfaces 31, 33, 35, 37, or 32, 34, 36, 38, and the side wall surfaces 16, 17 to be made large. This makes it possible to facilitate dispersion of the load applied to the body 10 from the insert 20 in the chamfering process, thus improving durability of the insert 20.

The smaller the angle θ3 becomes, the longer the length L2 of the outer surfaces 31, 33, 35, 37, or the length L2 of the outer surfaces 32, 34, 36, 38 becomes. Therefore, it is preferable to set the angle θ3 to 20° or smaller. Setting of the angle θ3 to 20° or smaller ensures to provide the sufficient length L2. This allows sufficient contact areas between the arbitrary pair of the outer surfaces 31, 33, 35, 37, or 32, 34, 36, 38 and the side wall surfaces 16, 17, respectively. As a result, it is possible to facilitate dispersion of the load applied to the body 10 from the insert 20 in the chamfering process, thus improving durability of the insert 20.

In the case of varying the chamfering angle of the cutting edge by switching the arbitrary pair of the outer surfaces 31, 33, 35, 37 or 32, 34, 36, 38 for abutment on the side wall surfaces 16, 17, the insert 20 has to be rotated. In the above-described state where the insert 20 is assembled with the body 10 through fastening with the fastening member 15, the insert 20 cannot be rotated.

The insert 20 is rotated after completely releasing the fastening member 15 from the body 10. Then the fastening member 15 is fastened to the body 10 again so that the insert 20 is assembled with the body 10 for varying the chamfering angle of the cutting edge. In the above-described case, however, the process for releasing the fastening member 15 is troublesome and takes time. Furthermore, in the releasing process, the components are separated from one another, resulting in the unpreferable situation of difficulty in handling of the components.

In the embodiment, each of the outer surfaces 31, 33, 35, 37, and 32, 34, 36, 38 is inclined relative to the central axis C so that it gets closer to the central axis C as it becomes distant from the blade 22. Then fastening of the fastening member 15 is released to slightly separate the insert 20 from the body 10 while maintaining the state where the fastening member 15 fixed to the body 10 is inserted into the through hole 23. This makes it possible to make the outer surfaces 31, 33, 35, 37 or 32, 34, 36, 38 distant from the side wall surfaces 16, 17, respectively. It is possible to suppress interference with the rotation of the insert 20 around the through hole 23 (fastening member 15), caused by abutment of the outer surfaces 31, 33, 35, 37, or 32, 34, 36, 38 on the side wall surfaces 16, 17 without making the insert 20 excessively distant from the body 10. As a result, the chamfering angle of the cutting edge may be varied by switching the surface in abutment on the side wall surface while maintaining the state where the fastening member 15 fixed to the body 10 is inserted into the through hole 23. It is therefore possible to facilitate the process for varying the chamfering angle of the cutting edge.

The internal diameter of the through hole 23 may be made relatively larger than the external diameter of the fastening member 15 so as to allow the use of a flat countersunk head screw having the conical bearing surface for the fastening member 15, or to form the inner surface of the through hole 23 having the part in contact with the bearing surface of the fastening member 15 to have a conical shape while having the diameter expanded toward the bottom surface 13. In the above-described case, slight release of fastening of the fastening member 15 allows the insert 20 to move in the radial direction with respect to the fastening member 15 in the state where the fastening member 15 fixed to the body 10 is inserted into the through hole 23, and in the state where the back surface 24 of the insert 20 is in contact with the bottom surface 13 of the fitting recess 12. As a result, the chamfering angle of the cutting edge may be varied by making the outer surfaces 31, 33, 35, 37, or 32, 34, 36, 38 distant from the corresponding side wall surfaces 16, 17. It is possible to facilitate the process for varying the chamfering angle of the cutting edge.

Fastening of the fastening member 15 allows its bearing surface and the conical shape of the through hole 23 to make the central axis C of the fastening member 15 coincident with that of the through hole 23 so that the insert 20 is disposed in the predetermined position of the fitting recess 12. As a result, this ensures to constrain the outer surfaces 31, 33, 35, 37, or 32, 34, 36, 38 with the corresponding side wall surfaces 16, 17, respectively.

The larger the angle θ1 formed between the side wall surfaces 16 and 17 becomes, the easier the insert 20 becomes rotatable between the side wall surfaces 16 and 17 upon switching of the outer surfaces 31 to 38 for abutment on the side wall surfaces 16, 17. As a result, it is possible to facilitate the process for varying the chamfering angle of the cutting edge.

As the angle formed between the surfaces for abutment on the side wall surfaces 16, 17 becomes larger at the timing before or after the switching, the maximum radius of the part that is likely to interfere with the side wall surfaces 16, 17 may be reduced. Although each distance between the outer surfaces 31, 33, 35, 37, or 32, 34, 36, 38, and the side wall surfaces 16, 17 is short, the surfaces in abutment on the side wall surfaces 16, 17 may be easily switched. This allows the amount of releasing the fastening of the fastening member 15 to be made smaller, thus further facilitating the process for varying the chamfering angle of the cutting edge.

The relief part 18 is formed at the corner between the side wall surfaces 16 and 17 to prevent the body 10 from interfering each movement track of the apexes formed between the outer surfaces 33 and 32 upon switching of the surfaces for abutment on the side wall surfaces 16, 17 between the outer surfaces 31, 33 and 32, 34. Upon variation in the chamfering angle of the cutting edge, the interference between the body 10 and the insert 20 may be suppressed, thus further facilitating the process for varying the chamfering angle of the cutting edge.

The dimension of the groove 11 is set so that the edges 26a to 26d of the blade 22 do not interfere with the body 10 assembled with the insert 20. It is further set so that the movement tracks of the apexes formed between the edges 26a to 26d of the blade 22 do not interfere with the body 10 upon switching of the outer surfaces for abutment on the side wall surfaces 16, 17 between the outer surfaces 31, 33 and 32, 34. As a result, this facilitates the assembly of the insert 20 with the body 10 as well as the process for varying the chamfering angle of the cutting edge.

Referring to FIG. 5(a) indicating assembly of the insert 20 with the body 10 by bringing a pair of outer surfaces (outer surfaces) 31 and 33 into abutment on the pair of side wall surfaces 16 and 17, the positioning part 19a of the body 10 is located at the position corresponding to an apex 27 formed between the outer surfaces 36 and 37. Referring to FIG. 5(b) indicating assembly of the insert 20 with the body 10 by bringing a pair of outer surfaces 32 and 34 in abutment on the pair of side wall surfaces 16 and 17, the positioning part 19b of the body 10 is located at the position corresponding to the apex 27 formed between the outer surfaces 36 and 37. Even in the state where the body 10 is assembled with the insert 20, it is possible to identify the outer surfaces in abutment on the side wall surfaces 16 and 17, that is, 31, 33 or 32, 34 in reference to the correlation between the positioning parts 19a, 19b and the apex 27. As a result, it is possible to facilitate identification of the chamfering angle of the cutting edge 26d in reference to the correlation between the positioning parts 19a, 19b and the apex 27.

A second embodiment will be described referring to FIGS. 6 to 7(c). In the first embodiment, the constraining part 21 of the insert 20 has the truncated octagonal pyramid shape (substantially octagonal shape in the view of the axial direction of the central axis C). Meanwhile, in the second embodiment, a constraining part 41 of an insert 40 has a truncated regular dodecagonal pyramid shape (substantially regular dodecagonal shape in the view of the axial direction of the central axis C). The same components as those described in the first embodiment will be designated with the same codes, and explanations thereof, thus will be omitted.

Figure 6:
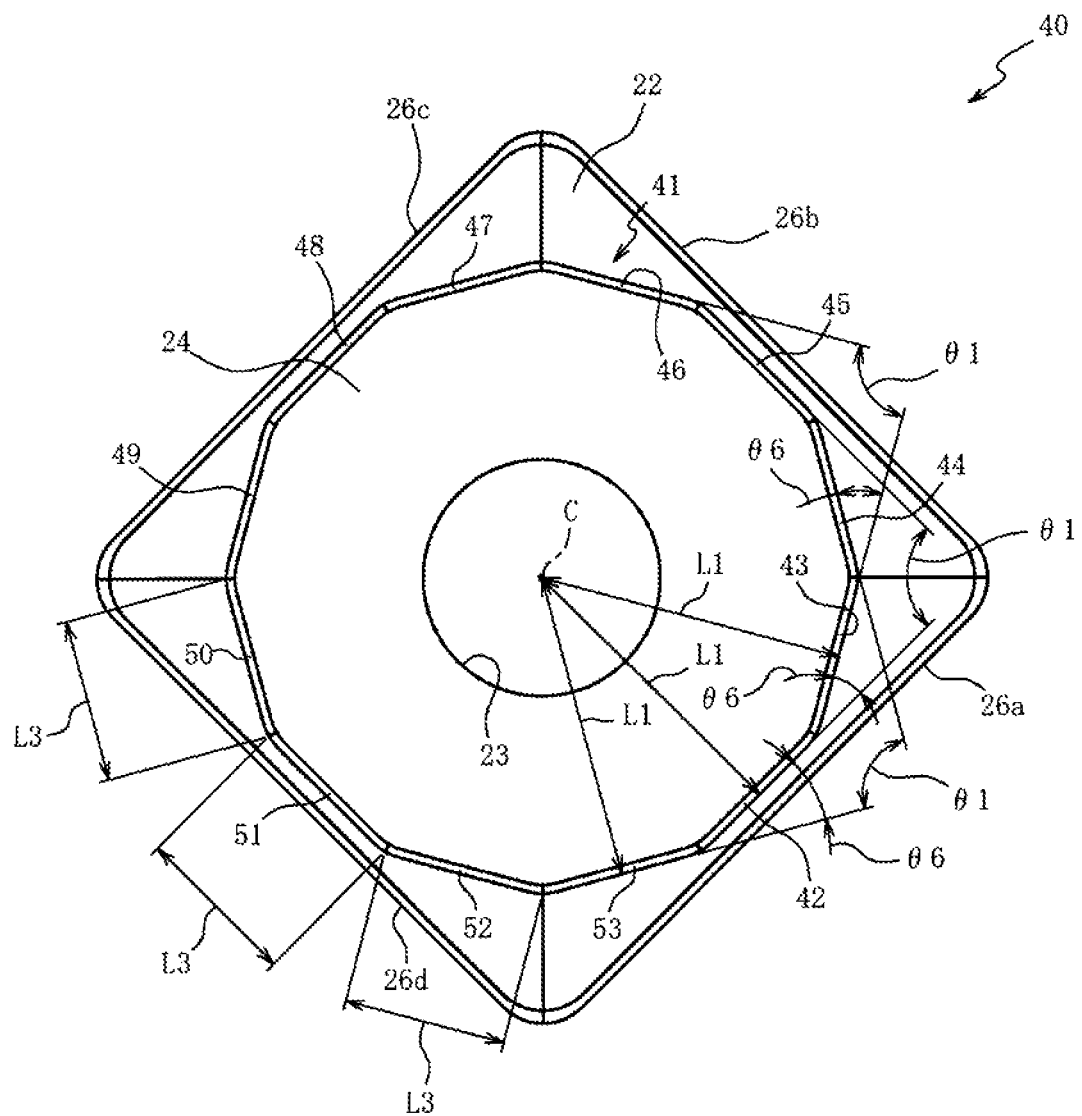
FIG. 6 is a back view of an insert according to a second embodiment.
Figure 7A:
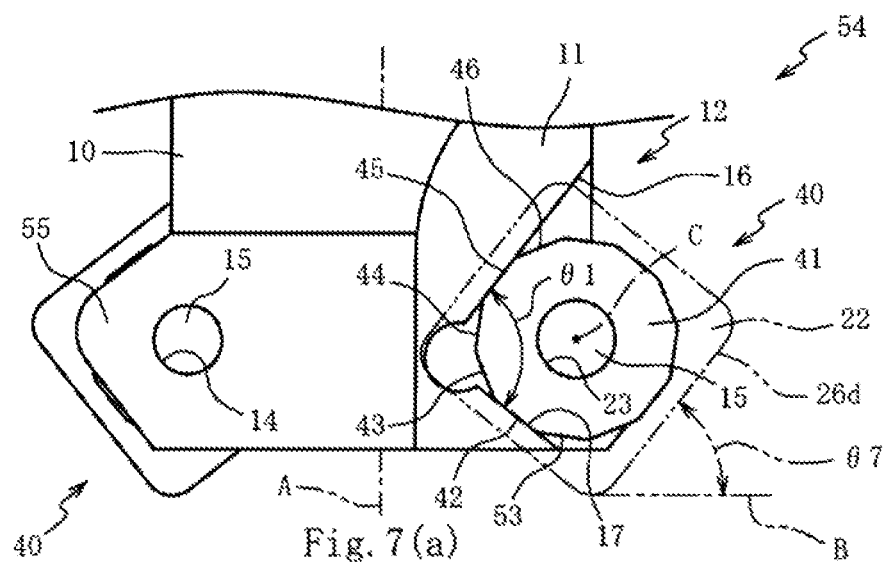
FIGS. 7(a) to 7(c) are schematic views each showing an indexable chamfering tool at a different chamfering angle.
Figure 7B:
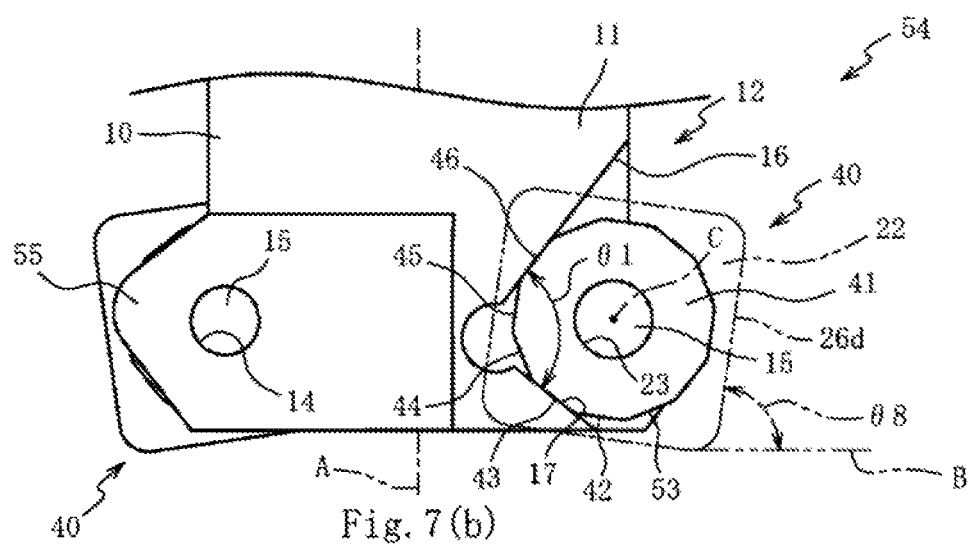

FIG. 6 is a back view of the insert 40 according to the second embodiment. FIGS. 7(a) to 7(c) are schematic views each showing an indexable chamfering tool 54 at a different chamfering angle. The body 10 according to the second embodiment is substantially the same as the body 10 according to the first embodiment except a shape of a projection part 55 having the outer circumferential surface of the body 10 at the tip end radially outwardly projected into an angular shape. The body 10 according to the second embodiment will be described on the assumption that it is the same as the body 10 according to the first embodiment. The shape of the projection part of the second embodiment may be made the same as the shape of the projection part 19 according to the first embodiment.

As FIG. 6 shows, the insert 40 is a member made of such material as the high speed tool steel and the superalloy. The insert 40 includes a plate-like constraining part 41, and the blade 22 integrated with the constraining part 41.

The constraining part 41 is fitted with the fitting recess 12 (see FIGS. 2(a), 2(b), 7(a), 7(b) and 7(c)), and formed into a truncated regular dodecagonal pyramid shape having the height in the plate thickness direction. The constraining part 41 includes the through hole 23 that pierces through the center of the constraining part in the plate thickness direction, and outer surfaces 42 to 53 sequentially arranged around the central axis C of the through hole 23. Likewise the first embodiment, each of the outer surfaces 42 to 53 of the constraining part 41 with the truncated regular dodecagonal pyramid shape is inclined relative to the central axis C at the angle θ2 so that it gets closer to the central axis C as it becomes distant from the blade 22 in the axial direction of the central axis C.

The back surface 24 as one surface of the constraining part 41 perpendicular to the central axis C has its external shape relatively small as a result of inclination relative to the central axis C. The front surface 25 as the other surface of the constraining part 41 has its external shape relatively large. The shape of the back surface 24 in the back view (in the view of the axial direction of the central axis C) is substantially the same as the shape of the section (hereinafter referred to as "axially right angle section of the constraining part 41") of the constraining part 41 perpendicular to the central axis C. The axially right angle section of the constraining part 41 has its dimension gradually increased toward the front surface 25 from the back surface 24.

The outer surfaces 42, 45, 48, 51 are flat surfaces corresponding to the respective outer surfaces of the specific truncated square pyramid. In other words, referring to the axially right angle section of the constraining part 41, each angle formed between the outer surfaces 42 and 45, 42 and 51, 48 and 45, 48 and 51 becomes the same as the angle θ1 formed between the pair of side wall surfaces 16 and 17. In this embodiment, each of the outer surfaces 42, 45, 48, 51 constitutes the first constraining surface.

The outer surfaces 43, 46, 49, 52 are flat surfaces corresponding to the respective outer surfaces 42, 45, 48, 51 that constitute the truncated square pyramid that has been rotated counterclockwise around the central axis C at an angle θ6 (30°) in the back view. The outer surfaces 44, 47, 50, 53 are flat surfaces corresponding to the respective outer surfaces 43, 46, 49, 52 that constitute the truncated square pyramid that has been rotated counterclockwise around the central axis C at the angle θ6 in the back view.

Referring to the axially right angle section of the constraining part 41, angles formed between the outer surfaces 43 and 46, 43 and 52, 49 and 46, 49 and 52, 44 and 47, 44 and 53, 50 and 47, 50 and 53, respectively become the same as the angle θ1 formed between the pair of side wall surfaces 16 and 17. In this embodiment, each of the outer surfaces 43, 46, 49, 52 constitutes the second constraining surface, and each of the outer surfaces 44, 47, 50, 53 constitutes the third constraining surface. Referring to the axially right angle section of the constraining part 41, the outer surfaces 42, 45, 48, 51 (first constraining surface), 43, 46, 49, 52 (second constraining surface), and 44, 47, 50, 53 (third constraining surface) correspond to the respective sides of the regular dodecagon.

Referring to the axially right angle section of the constraining part 41, each of the outer surfaces 42 to 53 has the same shortest distance L1 from the central axis C. Referring to the axially right angle section of the constraining part 41 with substantially regular dodecagonal shape, if the shortest distance L1 from the central axis C to each of the outer surfaces 42 to 53 is set to be the same, each of the outer surfaces 42 to 53 has the same length L3. Likewise the first embodiment, as each of the outer surfaces 42 to 53 has the same length L3, upon abutment of the respective outer surfaces 42 to 53 on the side wall surfaces 16, 17, the difference of the load applied to the respective sections between the outer surfaces and the side wall surfaces may be reduced, allowing the chamfering process using the insert 40 in accordance with the same specification.

The insert 40 is disposed so that the outer surface 42, the outer surface 43, and the third constraining surface 53 each as the single side are directed to face the edge 26a. The insert 40 is formed in a four-fold symmetrical manner around the central axis C.

As FIG. 7(a) shows, the constraining part 41 is fitted with the fitting recess 12, and the fastening member 15 is fastened into the fastener hole 14 of the body 10 while being inserted into the through hole 23 of the constraining part 41. The insert 40 is then assembled with the body 10 for assembly of the indexable chamfering tool 54 (hereinafter referred to as "tool 54").

Referring to the section perpendicular to the central axis C, the angle θ1 formed between the pair of side wall surfaces 16 and 17 is the same as the angle θ1 formed between the pair of outer surfaces 42 and 45. The inclination angle θ2 of the side wall surfaces 16, 17 relative to the central axis C is the same as the inclination angle θ2 of the outer surfaces 42, 45 relative to the central axis C (not shown in the embodiment). Furthermore, referring to the axially right angle section perpendicular to the central axis C at the same height from the back surface 24 of the constraining part 41, and from the bottom surface 13 of the fitting recess 12, the shortest length L1 from the central axis C to the pair of outer surfaces 42 and 45 is the same as the shortest distance L1 from the central axis C to the inclined side wall surfaces 16, 17. As a result, when assembling the insert 40 with the body 10 while having the constraining part 41 fitted in the fitting recess 12, the pair of outer surfaces 42 and 45 may be abutted on the pair of side wall surfaces 16 and 17, respectively.

In the case of the tool 54 having the pair of outer surfaces 42 and 45 abutted on the pair of side wall surfaces 16 and 17, respectively, the edge 26d of the insert 40 becomes the cutting edge for the chamfering process. In the view of the axial direction of the central axis C, the chamfering process of the workpiece (not shown) is executed using the cutting edge 26d at the chamfering angle θ7 formed between the cutting edge 26d and the virtual plane B corresponding to the plane perpendicular to the axial center A of the tool 54. In the view of the axial direction of the central axis C, the cutting edge 26d is parallel to the outer surface 45. Therefore, the chamfering angle θ7 is determined in accordance with the angle formed between the side wall surface 16 on which the outer surface 45 is abutted and the axial center A.

The fastening member 15 is inserted into the through hole 23, and the pair of outer surfaces 42 and 45 are in contact with the pair of side wall surfaces 16 and 17, respectively. Therefore, the pair of outer surfaces 42 and 45 are constrained with the pair of side wall surfaces 16 and 17 to lock the rotation of the insert 40 around the through hole 23 (fastening member 15). As a result, it is possible to suppress change in the chamfering angle θ7 of the cutting edge 26d caused by the rotation of the insert 40 in the chamfering process.

Referring to the section perpendicular to the central axis C, the angles θ1 formed between the pair of outer surfaces 42 and 45, the pair of outer surfaces 43 and 46, and the pair of third constraining surfaces 44 and 53 are all set to the same value. The inclination angles θ2 of the outer surfaces 42, 45 relative to the central axis C, the outer surfaces 43, 46 relative to the central axis C, and the third constraining surfaces 44, 53 relative to the central axis C are all set to the same value (not shown in this embodiment). Referring to the axially right angle section of the constraining part 41, the shortest distance L1 from the central axis C to the pair of outer surfaces 42, 45, from the central axis C to the pair of outer surfaces 43, 46, and from the central axis C to the pair of third constraining surfaces 44, 53 are all set to the same value.

As FIG. 7(b) shows, the counterclockwise rotation of the constraining part 41 around the through hole 23 (fastening member 15) at the angle θ6 from the abutment state of the pair of outer surfaces 42 and 45 respectively on the pair of side wall surfaces 16 and 17 allows abutment of the pair of outer surfaces 43 and 46 on the pair of side wall surfaces 16 and 17, respectively. As FIG. 7(c) shows, the clockwise rotation of the constraining part 41 around the through hole 23 (fastening member 15) at the angle θ6 from the abutment state of the pair of outer surfaces 42 and 45 respectively on the pair of side wall surfaces 16 and 17 allows abutment of the pair of third constraining surfaces 44 and 53 on the pair of side wall surfaces 16 and 17, respectively.

Figure 7C:
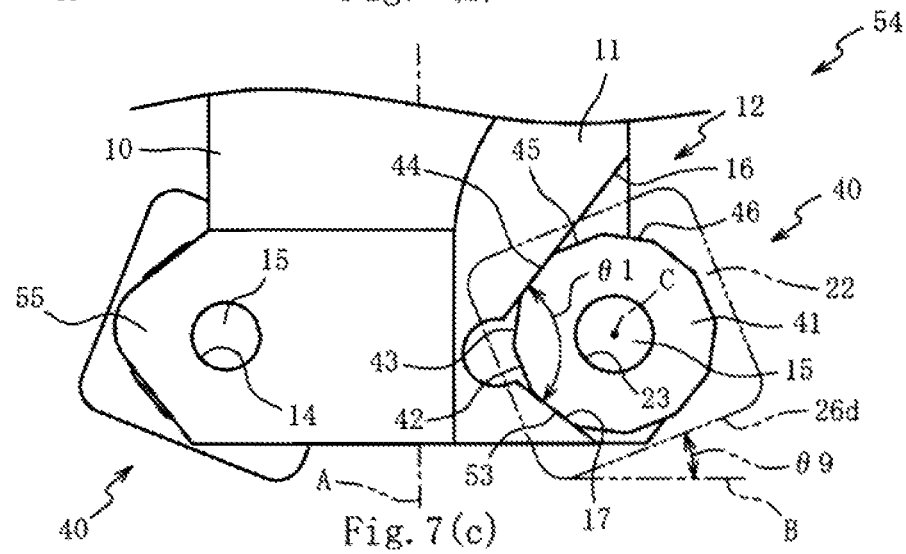

Even if the abutment state of the pair of outer surfaces 42 and 45 is switched to either the abutment state of the pair of outer surfaces 43 and 46 on the pair of side wall surfaces 16 and 17 (see FIG. 7(b)), or the abutment state of the pair of the third constraining surfaces 44 and 53 on the pair of side wall surfaces 16 and 17 (see FIG. 7(c)), it is not necessary to change the position of the fastening member 15 fastened to the body 10 or replace the body 10. In either the case as shown in FIG. 7(b) or FIG. 7(c), the edge 26d of the insert 40 becomes the cutting edge in the similar way to the case as shown in FIG. 7(a).

In the state as shown in FIG. 7(b), the chamfering angle designated as an angle θ8 formed between the virtual plane B and the cutting edge 26d is different from the chamfering angle θ7 in the abutment state of the pair of outer surfaces 42 and 45. The chamfering angle θ8 is obtained by adding the angle θ6 to the angle θ7 as a result of the counterclockwise rotation of the insert 40 at the angle θ6.

In the state as shown in FIG. 7(c), the chamfering angle designated as an angle θ9 formed between the virtual plane B and the cutting edge 26d is different from the chamfering angle θ7 in the abutment state of the pair of outer surfaces 42 and 45. The chamfering angle θ9 is obtained by subtracting the angle θ7 from the angle θ6 as a result of the clockwise rotation of the insert 40 at the angle θ6.

In either the case as shown in FIG. 7(b) or FIG. 7(c), assembly of the insert 40 with the body 10 using the fastening member 15 ensures to lock the rotation of the insert 40 around the through hole 23 while having the pair of outer surfaces 43 and 46 or the pair of third constraining surfaces 44 and 53 constrained with the pair of side wall surfaces 16 and 17. In other words, it is possible to suppress change in the chamfering angle of the cutting edge 26d caused by the rotation of the insert 40 in the chamfering process. As a result, it is possible to vary the chamfering angle of the cutting edge 26d without replacing the body 10, and to prevent change in the chamfering angle of the cutting edge 26d in the chamfering process.

In the view of the axial direction of the central axis C, the blade 22 has a substantially quadrangular shape. Each side of the constraining part 41 with substantially regular dodecagonal shape becomes any one of the outer surfaces 42, 45, 48, 51, the outer surfaces 43, 46, 49, 52, or the third constraining surfaces 44, 47, 50, 53. The blade 22, the outer surfaces 42, 45, 48, 51, the outer surfaces 43, 46, 49, 52, and the third constraining surfaces 44, 47, 50, 53 are disposed on the whole circumference. The number of apexes of the blade 22 is different from the number of apexes of the constraining part 41. Therefore, likewise the first embodiment, it is possible to vary the chamfering angle of the cutting edge without replacing the body 10, and to switch the cutting edge of the blade 22 to any one of the edges 26a, 26b, 26c, 26d (one side).

In the view of the axial direction of the central axis C, the number of apexes of the constraining part 41 having substantially regular dodecagonal shape is set to the value three times more than the number of apexes of the blade 22 with substantially square shape. This makes it possible to set each chamfering angle of the edges 26a, 26b, 26c, 26d (one side) of the blade 22 to three chamfering angle patterns including θ7, θ8, θ9. In other words, the number of chamfering angle patterns may be set to the value corresponding to the multiplier by which the number of apexes of the blade 22 is multiplied to obtain the number of apexes of the constraining part 41. It is possible to suppress biased use of the specific single side of the blade 22 with many chamfering angle patterns, prolonging the service life of the insert 40.

Unlike the first embodiment in which the number of apexes of the constraining part 21 is twice more than the number of apexes of the blade 22, the second embodiment has the number of apexes of the constraining part 41 three times more than the number of apexes of the blade 22. This embodiment allows increase in the number of chamfering angle patterns for the single side of the blade 22. As a result, versatility of the tool 54 may further be improved.

In the first embodiment, the tool 1 is formed by assembling the insert 20 with the body 10, while having two chamfering angle patterns including θ4 and θ5. In the second embodiment, the tool 54 is formed by assembling the insert 40 with the same body 10 as that of the first embodiment, while having three chamfering angle patterns including θ7, θ8, θ9 which are different from θ4, θ5. As described above, the shape of the insert 20 is different from that of the insert 40 so that the number of chamfering angle patterns is increased while using the body 10 in common. Compared with the case for increasing the chamfering angle patterns by replacing the body 10, this embodiment attains further cost reduction.

A third embodiment will be described referring to FIGS. 8(a) to 9(c). In the first embodiment, the explanation has been made about the constraining part 21 of the insert 20 having the truncated octagonal pyramid shape (substantially octagonal shape in the view of the axial direction of the central axis C). In the third embodiment, an explanation will be made about a constraining part 71 of an insert 70 having a regular hexagonal prism shape (substantially regular hexagonal shape in the view of the axial direction of the central axis C). The same components as those described in the first embodiment are designated with the same codes, and explanations thereof, thus will be omitted.

Figure 8A:
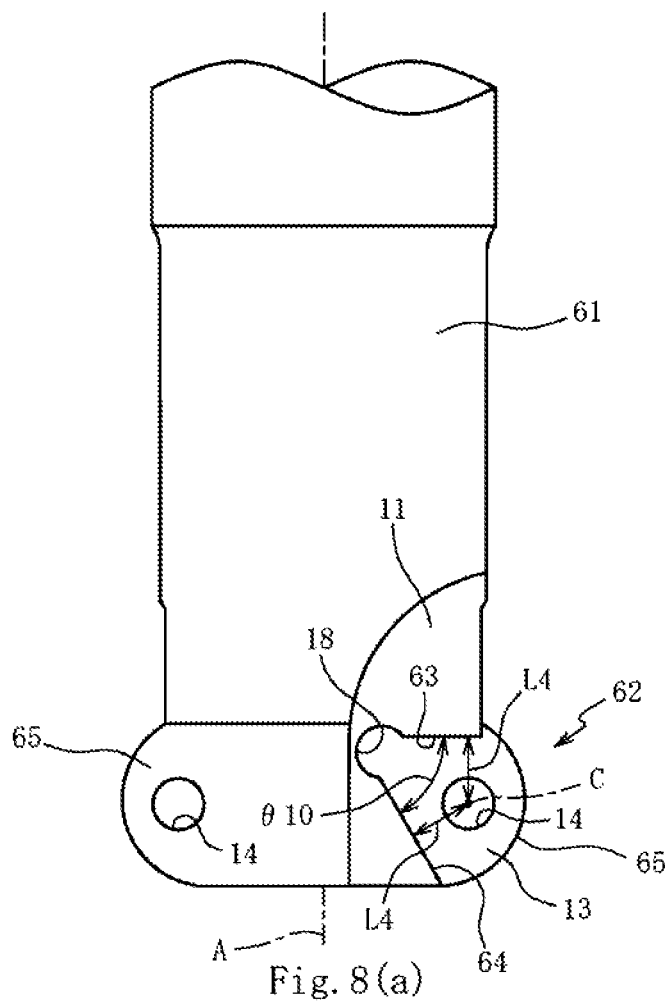
FIG. 8(a) is a front view of a body according to a third embodiment.
Figure 8B:
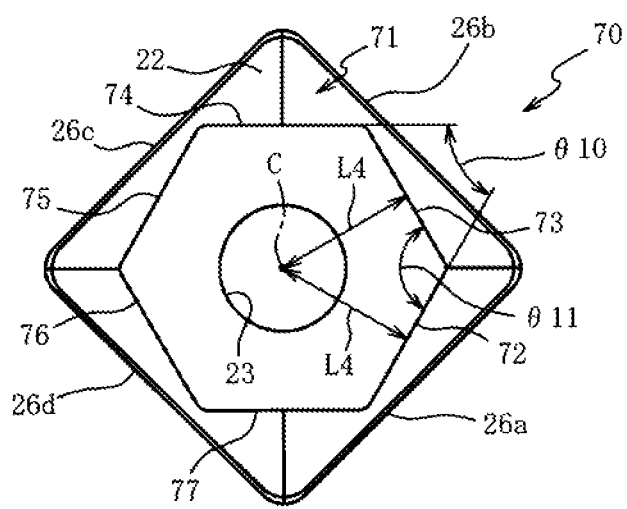
FIG. 8(b) is a back view of an insert.

FIG. 8(a) is a front view of a body 61 according to the third embodiment. FIG. 8(b) is a back view of the insert 70.

Figure 9A:
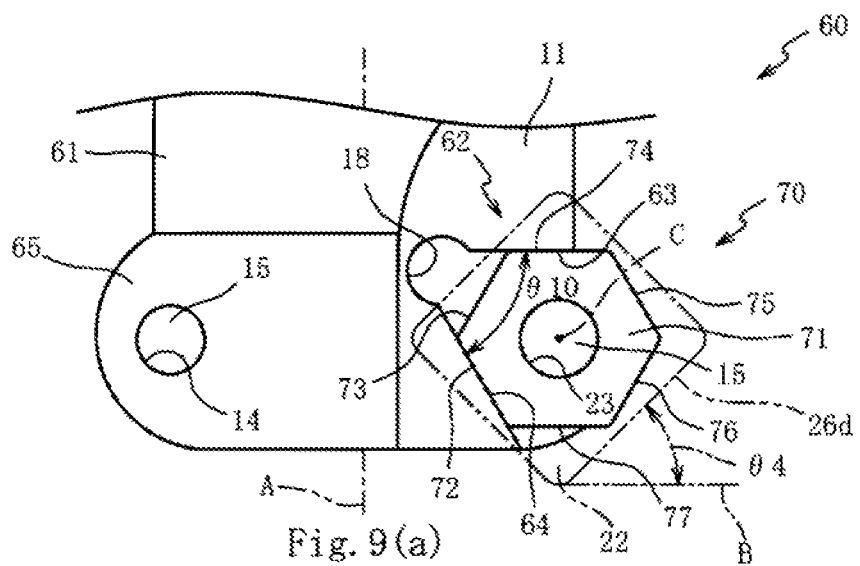
FIGS. 9(a) to 9(c) are schematic views each showing an indexable chamfering tool at a different chamfering angle.
Figure 9B:
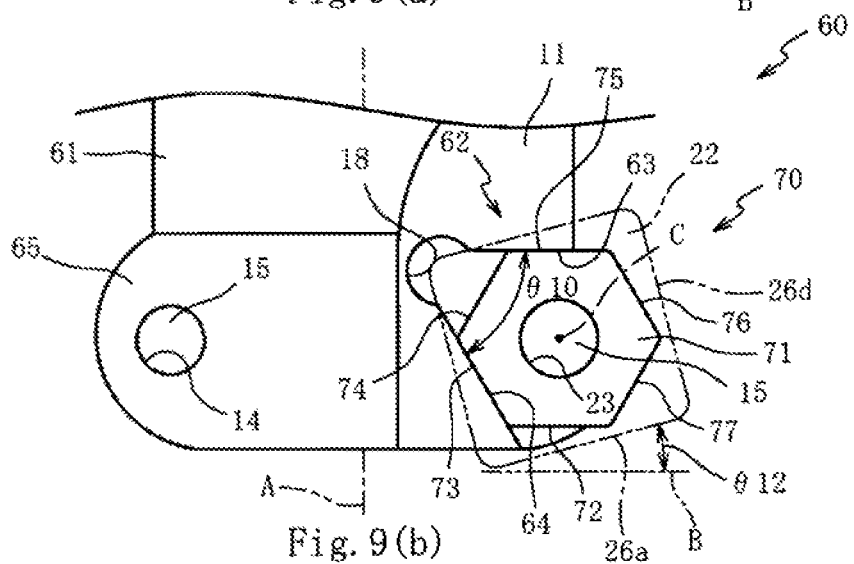
Figure 9C:
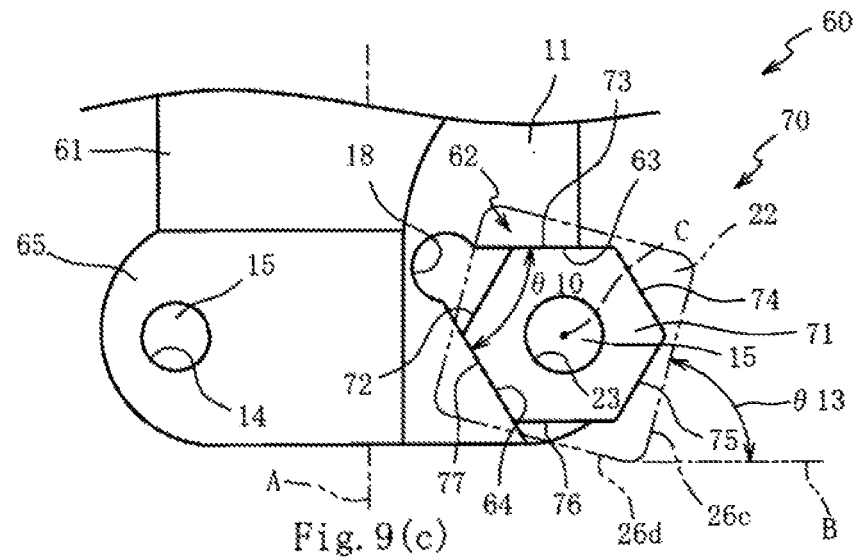

FIGS. 9(a) to 9(c) are schematic views each showing an indexable chamfering tool 60 at a different chamfering angle.

As FIG. 8(a) shows, the body 61 is a substantially columnar member made of such material as the high speed tool steel and the superalloy. The body 61 has two grooves 11 each formed by radially inwardly making a recess in the tip end (lower end) of the body. The body 61 having the grooves 11 is formed in the rotationally symmetrical manner around the axial center A.

The groove 11 has a fitting recess 62 formed by making the recess in the body 61 in the circumferential direction. The bottom surface 13 of the fitting recess 62 has the fastener hole 14 that pierces through the body 61 perpendicularly to the bottom surface 13. The fastening member 15 (see FIGS. 9(a) to 9(c)) as the screw is fastened into the fastener hole 14.

The fitting recess 62 is a substantially triangular recess in a front view (in the view of the axial direction of the central axis C). The fitting recess 62 has two sides near the axial center A, constituting the side wall surfaces 63, 64, and one side apart from the axial center A opened radially outwardly. A part of the insert 70 (see FIG. 8(b)) is fitted with the fitting recess 62 so that the insert 70 is partially abutted on the bottom surface 13 and the pair of side wall surfaces 63 and 64.

The body 61 includes a projection part 65 which projects radially outwardly from the outer circumferential surface between the grooves 11 at the tip end side while forming an arc-like shape. The projection part 65 secures the area of the insert 70 supported by the bottom surface 13.

The side wall surface 63 is disposed perpendicularly to the axial center A in the front view. In the front view, an angle θ10 formed between the side wall surfaces 63 and 64 is 60°. The side wall surfaces 63, 64 perpendicularly rise up from the bottom surface 13. In other words, the side wall surfaces 63, 64 are formed parallel to the central axis C.

As FIG. 8(b) shows, the insert 70 is a member made of such material as the high speed tool steel and the superalloy. The insert 70 includes a plate-like constraining part 71 and the blade 22 integrated with the constraining part 71.

The constraining part 71 is fitted with the fitting recess 62 (see FIG. 8(a)), and formed into the regular hexagonal prism shape while having the height in the plate thickness direction. The constraining part 71 includes the through hole 23 that pierces through the center in the plate thickness direction, and outer surfaces 72 to 77 sequentially arranged around the central axis C of the through hole 23. The outer surfaces 72 to 77 of the constraining part 71 with regular hexagonal prism shape are formed parallel to the central axis C.

The blade 22 projects from one end of the constraining part 71 in the axial direction radially outwardly. One end surface of the constraining part 71 at the side of the blade 22 in the axial direction becomes the front surface 25. The other end surface apart from the blade 22 becomes the back surface 24. The back surface 24 in the back view (view of the axial direction of central axis C) has the shape substantially the same as that of the section (hereinafter referred to as "axially right angle section of the constraining part 71") of the constraining part 71 perpendicular to the central axis C.

Each angle θ11 formed between adjacent outer surfaces 72 to 77 is 120°. Each angle θ10 formed between the outer surfaces 72 to 77 while interposing one outer surface is 60° that is the same angle as the θ10 formed between the side wall surfaces 63 and 64.

Each of the shortest distances L4 from the central axis C of the through hole 23 to the respective outer surfaces 72 to 77 is set to the same value. The shortest distance L4 is the same as the shortest distance L4 (see FIG. 8(a)) from the central axis C of the fastener hole 14 to the side wall surfaces 63, 64, respectively. An apex formed between the outer surfaces 72 and 73 exists on the line derived from connecting the apex formed between the edges 26a and 26b to the central axis C.

As FIG. 9(a) shows, the constraining part 71 is fitted with the fitting recess 62, and the fastening member 15 is fastened into the fastener hole 14 of the body 61 while being inserted into the through hole 23 of the constraining part 71. As a result, the insert 70 is assembled with the body 61, thus forming the indexable chamfering tool 60 (hereinafter referred to as "tool 60").

Referring to the section perpendicular to the central axis C (in the view of the axial direction of the central axis C), the angle θ10 formed between the pair of side wall surfaces 63 and 64 is the same as the angle θ10 formed between the pair of outer surfaces 72 and 74. Furthermore, in the view of the axial direction of the central axis C, the shortest distance L4 from the central axis C to the pair of outer surfaces 72 and 74 is the same as the shortest distance L4 from the central axis C to the pair of side wall surfaces 63 and 64 (see FIGS. 8(a) and 8(b)). It is possible to assemble the insert 70 with the body 61 by fitting the constraining part 71 with the fitting recess 62 so as to bring the pair of outer surfaces 72 and 74 into abutment on the pair of side wall surfaces 63 and 64. Both the outer surfaces 72 and 74 constitute the first constraining surfaces.

In the state where the pair of outer surfaces 72 and 74 (first constraining surfaces) are respectively abutted on the pair of side wall surfaces 63 and 64 (the state shown in FIG. 9(a)), the edge 26d of the insert 70 becomes the cutting edge for the chamfering process. In the view of the axial direction of the central axis C, the angle θ4 (set to 45° in this embodiment) formed between the cutting edge 26d and the virtual plane B corresponding to the plane perpendicular to the axial center A of the tool 54 is set as the chamfering angle, at which the workpiece (not shown) is chamfered using the cutting edge 26d.

The fastening member 15 is inserted into the through hole 23 so that the pair of outer surfaces 72 and 74 are in contact with the pair of side wall surfaces 63 and 64, respectively. The pair of outer surfaces 72 and 74 are constrained with the pair of side wall surfaces 63 and 64 to lock the rotation of the insert 70 around the through hole 23 (fastening member 15). As a result, this makes it possible to suppress change in the chamfering angle θ4 of the cutting edge 26d caused by the rotation of the insert 70 in the chamfering process.

Referring to the section perpendicular to the central axis C (in the view of the axial direction of the central axis C), the angle θ10 formed between the pair of side wall surfaces 63 and 64 is the same as the angle θ10 formed between the outer surfaces 72 to 77 while interposing one outer surface. Furthermore, in the view of the axial direction of the central axis C, the shortest distance L4 from the central axis C to the pair of the outer surfaces 72 to 77 is the same as the shortest distance L4 from the central axis C to the pair of side wall surfaces 63 and 64 (see FIGS. 8(a) and 8(b)).

Rotation of the constraining part 71 around the through hole 23 (fastening member 15) from the state as shown in FIG. 9(a) allows switching of the arbitrary pair of outer surfaces of 72 to 77 for abutment on the pair of side wall surfaces 63 and 64, respectively, without changing the position of the fastening member 15 and replacing the body 61. In this case, assembly of the insert 70 with the body 61 using the fastening member 15 constrains the arbitrary pair of the outer surfaces 72 to 77 in abutment on the pair of side wall surfaces 63 and 64 therewith to lock the rotation of the insert 70 around the through hole 23.

In the case where the pair of outer surfaces 75 and 77 are respectively abutted on the pair of side wall surfaces 63 and 64, the edge 26b of the insert 70 becomes the cutting edge for the chamfering process. Furthermore, the angle formed between the edge 26b and the virtual plane B becomes the chamfering angle θ4. As described above, at the chamfering angle θ4, the outer surfaces 75, 77 constitute the first constraining surfaces in abutment on the side wall surfaces 63, 64.

As FIG. 9(b) shows, in the case where the pair of outer surfaces 73 and 75 are respectively abutted on the pair of side wall surfaces 63 and 64, the edge 26a of the insert 70 becomes the cutting edge for the chamfering process. Furthermore, the angle formed between the edge 26a and the virtual plane B becomes the chamfering angle θ12. The abutment state of the pair of outer surfaces 73 and 75 on the pair of side wall surfaces 63 and 64 (the state shown in FIG. 9(b)) is caused by rotating the insert 70 counterclockwise by the amount corresponding to the angle θ11 (60°) from the state as shown in FIG. 9(a).

As each angle formed between the respective edges 26a to 26d of the blade 22 is 90°, counterclockwise rotation of the insert 70 at θ11 (60°) decreases the chamfering angle by the amount corresponding to 30°. Meanwhile, clockwise rotation of the insert 70 at θ11 (60°) increases the chamfering angle by the amount corresponding to 30°. The chamfering angle is defined in the range from 0° to 90°. If the angle becomes lower than 0°, 90° (each angle formed between the respective edges 26a to 26d of the blade 22) is added to the lower angle. If the angle exceeds 90°, 90° (each angle formed between the respective edges 26a to 26d of the blade 22) is subtracted from the exceeding angle to calculate the chamfering angle of the cutting edge. Accordingly, the chamfering angle θ12 is derived from subtracting 30° from the angle θ4.

In the case where the pair of outer surfaces 72 and 76 are abutted on the pair of side wall surfaces 63 and 64, respectively, the edge 26c of the insert 70 becomes the cutting edge for the chamfering process. Furthermore, the angle formed between the edge 26c and the virtual plane B becomes the chamfering angle θ12. In the above-described manner, at the chamfering angle θ12, the pairs of outer surfaces 73 and 75, 72 and 76 each in abutment on the side wall surfaces 63 and 64 constitute the second constraining surfaces.

As FIG. 9(c) shows, in the case where the pair of outer surfaces 73 and 77 are respectively abutted on the pair of side wall surfaces 63 and 64, the edge 26c of the insert 70 becomes the cutting edge for the chamfering process. Furthermore, the angle formed between the edge 26c and the virtual plane B becomes the chamfering angle θ13. The abutment state of the pair of outer surfaces 73 and 77 on the pair of side wall surfaces 63 and 64 (the state shown in FIG. 9(c)) is caused by rotating the insert 70 clockwise by the amount corresponding to the angle θ11 (60°) from the state as shown in FIG. 9(a). Therefore, the value of the chamfering angle θ13 is derived from adding 30° to the angle θ4.

In the case where the pair of outer surfaces 74 and 76 are abutted on the pair of side wall surfaces 63 and 64, respectively, the edge 26a of the insert 70 becomes the cutting edge for the chamfering process. Furthermore, the angle formed between the edge 26a and the virtual plane B becomes the chamfering angle θ13. In the above-described manner, at the chamfering angle θ13, the pairs of outer surfaces 73 and 77, 74 and 76 in abutment on the side wall surfaces 63 and 64 constitute the third constraining surfaces.

As described above, likewise the first and the second embodiments, the tool 60 according to the third embodiment ensures to vary the chamfering angle of the cutting edge (edges 26a, 26b, 26c, 26d) without replacing the body 61, and to prevent change in the chamfering angle of the cutting edge in the chamfering process.

The blade 22 is formed on the whole circumference as well as the outer surfaces 72 to 77 constituting the first constraining surface, the second constraining surface, and the third constraining surface, respectively. The number of apexes of the blade 22 is different from the number of apexes of the constraining part 71. Accordingly, likewise the first and the second embodiments, it is possible to vary the chamfering angle of the cutting edge without replacing the body 61, and switching the edge as the cutting edge for the chamfering process from one of the edges 26a, 26b, 26c, 26d (single side) of the blade 22 to the other.

In this embodiment, as described above, if the edges 26b, 26d become the cutting edges, the chamfering angle becomes θ4. If the edges 26a, 26c become the cutting edges, there are two chamfering angle patterns including θ12 and θ13.

Figure 10A:
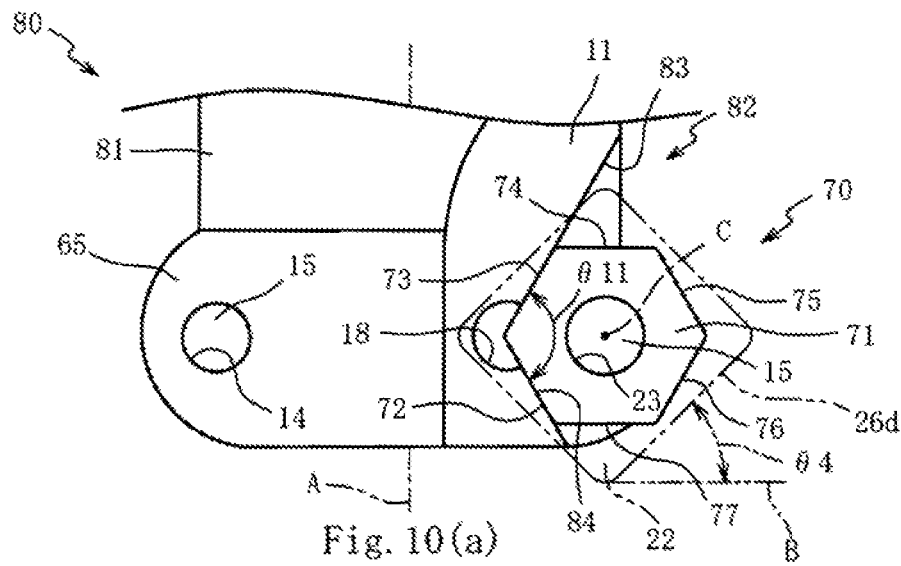
FIGS. 10(a) to 10(c) are schematic views each showing an indexable chamfering tool according to a fourth embodiment at a different chamfering angle.
Figure 10B:
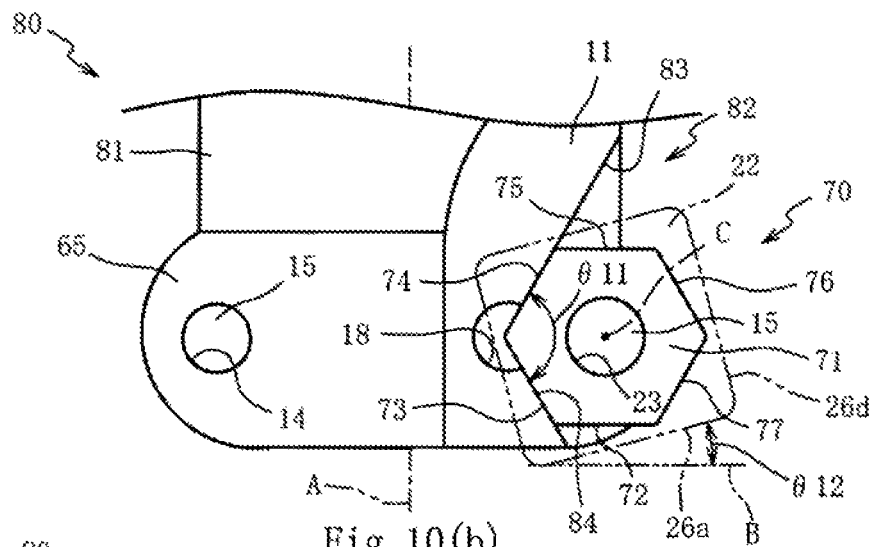
Figure 10C:
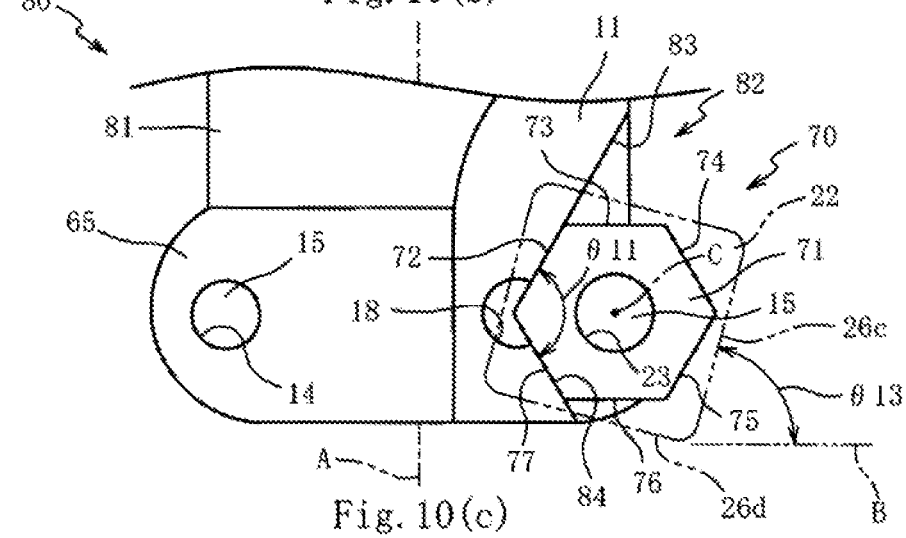

A fourth embodiment will be described referring to FIGS. 10(a) to 10(c). In the third embodiment, the angle θ10 formed between the side wall surfaces 63 and 64 is 60°. Meanwhile, in the fourth embodiment, the angle θ11 formed between the side wall surfaces 83 and 84 is 120°. The same components as those described in the first and the third embodiments will be designated with the same codes, and explanations thereof, thus will be omitted. FIGS. 10(a) to 10(c) are schematic views each showing an indexable chamfering tool 80 according to the fourth embodiment at a different chamfering angle.

As FIG. 10(a) shows, the indexable chamfering tool 80 (hereinafter referred to as "tool 80") is used for the chamfering process applied to a corner of the workpiece (not shown). The tool 80 includes a shaft-like body 81, and the insert 70 that is detachably assembled with the body 81 using the fastening member 15.

The body 81 is a substantially columnar member made of such material as the high speed tool steel and the superalloy. The body 81 includes two grooves 11 each formed by partially making a recess in a tip end (lower end) radially inwardly. The body 81 having the grooves 11 is formed in the rotational symmetrical manner around the axial center A.

The groove 11 has a fitting recess 82 formed by making a recess in the body 81 in the circumferential direction of the body 81. The fastener hole 14 that pierces through the body 81 is formed in the bottom surface 13 of the fitting recess 82 in the perpendicular direction. The fastening member 15 formed as the screw is fastened into the fastener hole 14.

The fitting recess 82 is a substantially triangular recess in the view of the axial direction of the central axis C. Two sides of the fitting recess 82 near the axial center A constitute the side wall surfaces 83, 84, and one side apart from the axial center A is opened radially outwardly. The insert 70 is partially fitted with the fitting recess 82 so that the insert 70 is partially abutted on the bottom surface 13, and the pair of side wall surfaces 83 and 84.

In the front view, the side wall surfaces 83 and 84 are inclined each at 60° relative to the axial center A. The angle θ11 formed between the side wall surfaces 83 and 84 is 120° in the front view. The side wall surfaces 83, 84 rise up from the bottom surface 13 in the perpendicular direction. In other words, the side wall surfaces 83, 84 are formed parallel to the central axis C.

Referring to the section perpendicular to the central axis C (in the view of the axial direction of the central axis C), the angle θ11 formed between the pair of side wall surfaces 83 and 84 is the same as the angle θ11 formed between the adjacent outer surfaces 72 to 77 of the insert 70. Furthermore, in the view of the axial direction of the central axis C, the shortest distance L4 from the central axis C to the respective outer surfaces 72 to 77 is the same as the shortest distance L4 from the central axis C to the pair of side wall surfaces 83 and 84 (not shown in the embodiment).

The adjacent outer surfaces 72 to 77 of the insert 70 may be respectively abutted on the pair of side wall surfaces 83 and 84 upon assembly of the insert 70 with the body 81 by fitting the constraining part 71 with the fitting recess 82. After assembly of the insert 70 with the body 81, the adjacent outer surfaces 72 to 77 of the insert 70 are constrained with the pair of side wall surfaces 83 and 84 so as to lock the rotation of the insert 70 around the through hole 23.

In the case where the pair of outer surfaces 72 and 73 are respectively abutted on the pair of side wall surfaces 83 and 84, the edge 26d of the insert 70 becomes the cutting edge for the chamfering process. In the case where the pair of outer surfaces 75 and 76 are abutted on the pair of side wall surfaces 83 and 84, the edge 26b of the insert 70 becomes the cutting edge for the chamfering process. In the above-described cases, the angle formed between the edge 26b or 26d and the virtual plane B becomes the chamfering angle 84. As described above, at the chamfering angle θ4, the pairs of outer surfaces 72 and 73, and the outer surfaces 75 and 76 in abutment on the side wall surface 83 and 84 constitute the first constraining surfaces.

As FIG. 10(b) shows, in the case where the pair of outer surfaces 73 and 74 are respectively abutted on the pair of side wall surfaces 83 and 84, the edge 26a of the insert 70 becomes the cutting edge for the chamfering process. In the case where the pair of outer surfaces 76 and 77 are abutted on the pair of side wall surfaces 83 and 84, the edge 26c of the insert 70 becomes the cutting edge for the chamfering process. In the above-described cases, the angle formed between the edge 26a or 26c and the virtual plane B becomes the chamfering angle θ12. As described above, at the chamfering angle θ12, the pairs of outer surfaces 73 and 74, and the outer surfaces 76 and 77 in abutment on the side wall surfaces 83 and 84 constitute the second constraining surfaces.

As FIG. 10(c) shows, in the case where the pair of outer surfaces 72 and 77 are respectively abutted on the pair of side wall surfaces 83 and 84, the edge 26c of the insert 70 becomes the cutting edge for the chamfering process. In the case where the pair of outer surfaces 74 and 75 are abutted on the pair of side wall surfaces 83 and 84, the edge 26a of the insert 70 becomes the cutting edge for the chamfering process. In the above-described cases, the angle formed between the edge 26a or 26c and the virtual plane B becomes the chamfering angle θ13. As described above, at the chamfering angle θ13, the pairs of outer surfaces 72 and 77, and the outer surfaces 74 and 75 in abutment on the side wall surfaces 83 and 84 constitute the third constraining surfaces.

As described above, likewise the first to the third embodiments, the tool 80 according to the fourth embodiment ensures to vary the chamfering angle of the cutting edge (edges 26a, 26b, 26c, 26d) without replacing the body 81, and to prevent change in the chamfering angle of the cutting edge in the chamfering process.

The angle θ10 formed between the side wall surfaces 63 and 64 of the body 61 according to the third embodiment is different from the angle θ11 formed between the side wall surfaces 83 and 84 of the body 81 according to the fourth embodiment. However, the same insert 70 is fitted. The insert 70 may be assembled to the variously shaped bodies 61 and 81 by differentiating the pair of the outer surfaces 72 to 77 of the insert 70 for abutment, thus improving versatility of the tools 60 and 80.

The angle θ10 formed between the side wall surfaces 63 and 64 according to the third embodiment is smaller than the angle θ11 formed between the side wall surfaces 83 and 84 according to the fourth embodiment. Compared with the side wall surfaces 83 and 84, the side wall surfaces 63 and 64 are more likely to prevent the rotation of the insert 70 around the central axis C.

The present invention has been described referring to the embodiments. The present invention is not limited to those embodiments, but may be variously modified and improved so long as they do not deviate from the scope of the present invention. For example, shapes and dimensions of the bodies 10, 61, 81, the inserts 20, 40, 70, and the fastening member 15 have been explained as mere examples. Therefore, they can be arbitrarily set.

The angle θ1 formed between the pair of side wall surfaces 16 and 17 (the angle θ10 formed between the side wall surfaces 63 and 64, and the angle θ11 formed between the side wall surfaces 83 and 84) may be arbitrarily changed. In accordance with the angle formed between the side wall surfaces, the angle formed between the pair of first side wall surfaces or second side wall surfaces of the constraining part may be changed. It is also possible to arbitrarily change the chamfering angles θ4, θ5, θ7, θ8, θ9, θ12, θ13 of the cutting edge, respectively. It is further possible to arbitrarily change the angles θ3 and θ6.

In the above-described embodiments, the blade 22 has a substantially square shape though it is not limited specifically. It is possible to form the blade 22 with a quadrangular shape except the square shape, or a polygonal shape except the quadrangular shape.

In the above-described embodiments, the constraining part 21 has the octagonal shape, the constraining part 41 has the regular dodecagonal shape, and the constraining part 71 has the regular hexagonal shape, referring to the axially right angle sections though they are not limited specifically. It is possible to arbitrarily change the shape of the constraining part so long as the following two conditions are satisfied. The first condition is satisfied if the outer surface of the constraining part around the central axis C includes a pair of first constraining surfaces abuttable on the pair of side wall surfaces, and a pair of second constraining surfaces having at least one surface different from the pair of first constraining surfaces as well as abuttable on the pair of side wall surfaces. The second condition is satisfied if the cutting edge upon fixation of the pair of first constraining surfaces becomes non-parallel to the cutting edge in the state where the constraining part is rotated around the central axis C from the fixed state of the pair of first constraining surfaces to place the pair of second constraining surfaces on the same surface, on which the pair of first constraining surfaces are fixed. In other words, the cutting edge that is set when the pair of the first constraining surfaces are abutted on the pair of side wall surfaces becomes non-parallel to the cutting edge that is set when the pair of second constraining surfaces are abutted on the pair of side wall surfaces. It is possible to switch the chamfering angle of the cutting edge in accordance with the states between abutment of the pair of first constraining surfaces on the pair of side wall surfaces, and abutment of the pair of second constraining surfaces on the pair of side wall surfaces.

In the second to the fourth embodiments, the third constraining surface is provided in addition to the first and the second constraining surfaces. The third constraining surface is designated for convenience of explanation. Under the condition for constituting the above-described constraining part, the third constraining surface is a part of the second constraining surface relative to the specific first constraining surface. In the case of no discrimination between the second constraining surface and the third constraining surface, the respective outer surfaces of the constraining part constitute either the first constraining surfaces or the second constraining surfaces in the second to the fourth embodiments.

It is necessary to satisfy the following two conditions so as to discriminate between the second constraining surface and the third constraining surface as described in the second to the fourth embodiments. The first condition is satisfied if the pair of third constraining surfaces are provided, having at least one surface different from the pair of first constraining surfaces and the pair of second constraining surfaces, and being abuttable on the pair of side wall surfaces. The second condition is satisfied if the cutting edge that is set when the pair of first constraining surfaces are abutted on the pair of side wall surfaces becomes non-parallel to the cutting edge that is set when the pair of second constraining surfaces are abutted on the pair of side wall surfaces, and non-parallel to the cutting edge that is set when the pair of third constraining surfaces are abutted on the pair of side wall surfaces. It is possible to vary the chamfering angle of the cutting edge in accordance with the states where the pair of first constraining surfaces are abutted on the pair of side wall surfaces, the pair of second constraining surfaces are abutted on the pair of side wall surfaces, and the pair of third constraining surfaces are abutted on the pair of side wall surfaces. Similarly, it is possible to provide the fourth constraining surfaces, the fifth constraining surfaces, and the like.

It is possible to form the constraining part into the octagonal shape, the regular dodecagonal shape, and the polygonal shape except the regular hexagonal shape so long as the above-described conditions are satisfied. The blade and the constraining part may be formed into the shape except the polygonal shape so that the blade, the first constraining surfaces, and the second constraining surfaces (including the third constraining surfaces and the fourth constraining surfaces) do not have to be provided on the whole circumference. For example, it is possible to connect the outer surfaces 31 and 34 via the curved surface instead of the outer surfaces 35 to 38 of the constraining part 21, so that the edges 26a and 26b of the blade 22 are omitted.

If all the outer surfaces of the constraining part around the central axis C constitute the first constraining surfaces or the second constraining surfaces (including the third constraining surface and the fourth constraining surface), it is possible to set the number of apexes of the polygonal constraining part to the value derived from multiplication of the number of apexes of the polygonal blade by an integer. In this case, it is possible to set the chamfering angle patterns for the single side of the blade to the value as the integer multiple. This makes it possible to suppress the biased use of the specific single side of the blade with many chamfering angle patterns, resulting in prolonged service life of the insert. The term "integer multiple" used in the specification refers to the integer except the negative integer, 0, and 1.

The more the number of apexes increases, the shorter the length of the single side of the constraining part becomes. It is not preferable because the area of the contact between the side wall surface and the first constraining surface, or between the side wall surface and the second constraining surface becomes small. If the number of apexes of the blade is four, it is preferable to set the number of apexes of the constraining part to the value four (or three) times as many or less. If the number of apexes of the blade is three, it is preferable to set the number of apexes of the constraining part to the value six (or five) times as many or less. If the number of apexes of the blade is five or more, it is preferable to set the number of apexes of the constraining part to the value three (or two) times as many or less.

In the above-described embodiments, the fastening member 15 as the screw is fastened into the fastener hole 14 of the body 10, 61, or 81 though it is not limited specifically. For example, the shaft of the screw is provided to stand from the bottom surface 13 of the fitting recess 12, 62, or 82 of the body 10, 61, or 81, respectively. Then the shaft is inserted into the through hole 23 of the insert 20, 40 or 70 so as to fit a nut with the shaft. In this case, the shaft and the nut constitute the fastening member. It is also possible to use a rivet, a pin and the like as the fastening member.

In the first embodiment, the angle shaped projection part 19 is formed at the tip end of the body 10. The projection part 19 has two apexes each serving as the positioning parts 19a, 19b though it is not limited specifically. Each of the positioning parts may be formed at the position corresponding to the predetermined apex of the constraining part 21 when the outer surfaces 31, 33, 35, 37 are respectively abutted on the pair of side wall surfaces 16 and 17, and at the position corresponding to the predetermined apex of the constraining part 21 when the outer surfaces 32, 34, 36, 38 are respectively abutted on the pair of side wall surface 16 and 17. For example, in the axial direction of the central axis C, it is possible to dispose the linear positioning part on the outer circumferential surface of the body 10 on the line connected between the apex of the blade 22 corresponding to the predetermined apex of the constraining part 21, and the central axis C. It is also possible to apply the positioning part to the second to the fourth embodiments.

The respective embodiments as described above have described the indexable chamfering tool 1, 54, 60, or 80 each configured to vary the chamfering angle of the cutting edge of the insert 20, 40, or 70 by switching the pair of outer surfaces of 32 to 38, 42 to 53, or 72 to 77 of the insert 20, 40 or 70 in abutment on the side wall surfaces 16 and 17, 63 and 64, or 83 and 84 of the body 10, 61, or 81, respectively though it is not limited specifically. The present invention is applicable to the indexable tool (for example, face milling cutter) except the indexable chamfering tools 1, 54, 60, 80 for the chamfering process of the workpiece so as to facilitate variation in the cutout angle of the cutting edge of the insert. The cutout angle refers to the inclination angle of the cutting edge relative to the axial center of the body.

The invention claimed is:

1. An insert for a cutting process, the insert being constrained with a pair of side wall surfaces of a fitting recess formed in a body of an indexable tool, and being assembled with the body by fastening with a fastening member, comprising:
    a constraining part fitted with the fitting recess;
    a through hole piercing through the constraining part, through which the fastening member is inserted; and
    a blade projecting from the constraining part in a direction perpendicular to a central axis of the through hole, wherein:
    the blade includes a cutting edge for the cutting process, the cutting edge forming a part of an edge apart from the central axis;
    an outer surface of the constraining part around the central axis includes a pair of first constraining surfaces abuttable on the pair of side wall surfaces, and a pair of second constraining surfaces having an angle formed between the second constraining surfaces is the same as an angle formed between the pair of first constraining surfaces in a section of the constraining part perpendicular to the central axis;
    a shortest distance from the central axis to the pair of first constraining surfaces is set to be the same as a shortest distance from the central axis to the pair of second constraining surfaces in the section of the constraining part perpendicular to the central axis; and
    a position of the cutting edge in a state where the pair of first constraining surfaces abuts on the pair of side wall surfaces becomes non-parallel to a position of the cutting edge in a state where the pair of second constraining surfaces abuts on the pair of side wall surfaces.

2. The insert according to claim 1, wherein in the section of the constraining part perpendicular to the central axis, a length of the first constraining surface is the same as a length of the second constraining surface.

3. The insert according to claim 1, wherein each of the first constraining surface and the second constraining surface is inclined relative to the central axis to become closer to the central axis as each of the first constraining surface and the second constraining surface becomes distant from the blade.

4. The insert according to claim 1, wherein:
    the blade is formed into a polygonal shape in a view of an axial direction of the central axis;
    the cutting edge is one side of the blade with the polygonal shape;
    the outer surface of the constraining part is formed into a polygonal shape having a number of apexes different from a number of apexes of the blade in the view of the axial direction of the central axis; and
    each side of the polygonal shape formed by the outer surface of the constraining part constitutes the first constraining surface or the second constraining surface.

5. The insert according to claim 4, wherein the number of apexes of the outer surface of the constraining part is set to a value as an integer multiple of the number of apexes of the blade.

6. A body for an indexable tool, the body being assembled with the insert according to claim 4 by fastening using the fastening member, comprising:
    a fitting recess formed by making a recess in a circumferential direction, with which the constraining part of the insert is fitted, the fitting recess having a pair of side wall surfaces on which the pair of first constraining surfaces or the pair of second constraining surfaces are abutted; and
    positioning parts, one of which is disposed at a position corresponding to an apex of the constraining part in an abutment state of the pair of first constraining surfaces on the pair of side wall surfaces, respectively, and the other of which is disposed at a position corresponding to an apex of the constraining part in an abutment state of the pair of second constraining surfaces on the pair of side wall surfaces, respectively.

* * * * *